United States Patent [19]

West, Jr. et al.

[11] 4,012,596

[45] Mar. 15, 1977

[54] TELEPHONE PATCH

[75] Inventors: William L. West, Jr., Lexington, Nebr.; William Sherman, III, Willingboro, N.J.

[73] Assignee: Reach Electronics Inc., Lexington, Nebr.

[22] Filed: Aug. 6, 1975

[21] Appl. No.: 602,377

[52] U.S. Cl. .......................... 179/41 A; 179/1 VC; 325/22

[51] Int. Cl.² ......................................... H04M 5/08

[58] Field of Search .............. 179/41 A, 1 VC, 2 H, 179/81 B; 325/21, 22, 55, 64, 66, 168

[56] References Cited

UNITED STATES PATENTS

| | | | |
|---|---|---|---|
| 2,819,340 | 1/1958 | Brody | 179/1 VC |
| 2,951,123 | 8/1960 | De Vito | 179/1 VC |
| 3,191,066 | 6/1965 | Staudenmayer | 325/22 |
| 3,217,254 | 11/1965 | Hughes et al. | 325/22 |
| 3,283,074 | 11/1966 | Csicsatka | 179/1 VC |
| 3,458,664 | 7/1969 | Adloch et al. | 179/41 A |
| 3,586,787 | 6/1971 | Vogelman et al. | 179/41 A |
| 3,897,592 | 7/1975 | Walker | 179/41 A |

Primary Examiner—Kathleen H. Claffy
Assistant Examiner—Gerald L. Brigance
Attorney, Agent, or Firm—Prangley, Dithmar, Vogel, Sandler & Stotland

[57] ABSTRACT

Electronic patch circuitry interconnects a wire telephone line with the base station transmitter and receiver of a simplex two-way radio communication system, for causing VOX-type operation with very fast voice-operated keying between transmitter and receiver. The system is operable in a telephone line priority mode in which it responds to telephone line audio signals for keying the transmitter on and the receiver off regardless of whether or not the receiver is on at the time, and is also operable in an "anti-VOX" mode. An automatic telephone line connector circuit responds to telephone ringing signals on the telephone line at the base station. The circuit then transmits a coded signal to a remote radio transceiver, which can return a signal to "answer" the base station telephone and connect it to the patch circuitry. Automatic dialing means are provided for initiating a telephone call from the remote radio transceiver. Timing circuitry holds the base transmitter off for a short time immediately after each telephone line connection to insure monitoring of the radio channel by the telephone subscriber before he can transmit. Additional transmit-on timers key the base transmitter off if it is on too long. The system "hangs up" the base station telephone after predetermined timed events or when dial tone occurs to prevent tie-up of the interconnection by the telephone line party.

34 Claims, 29 Drawing Figures

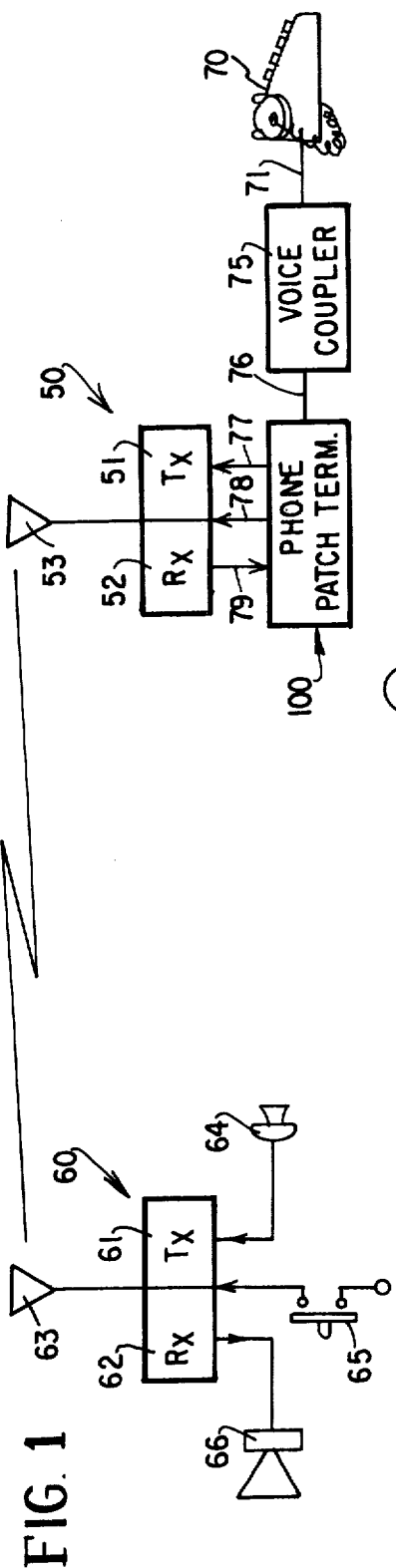
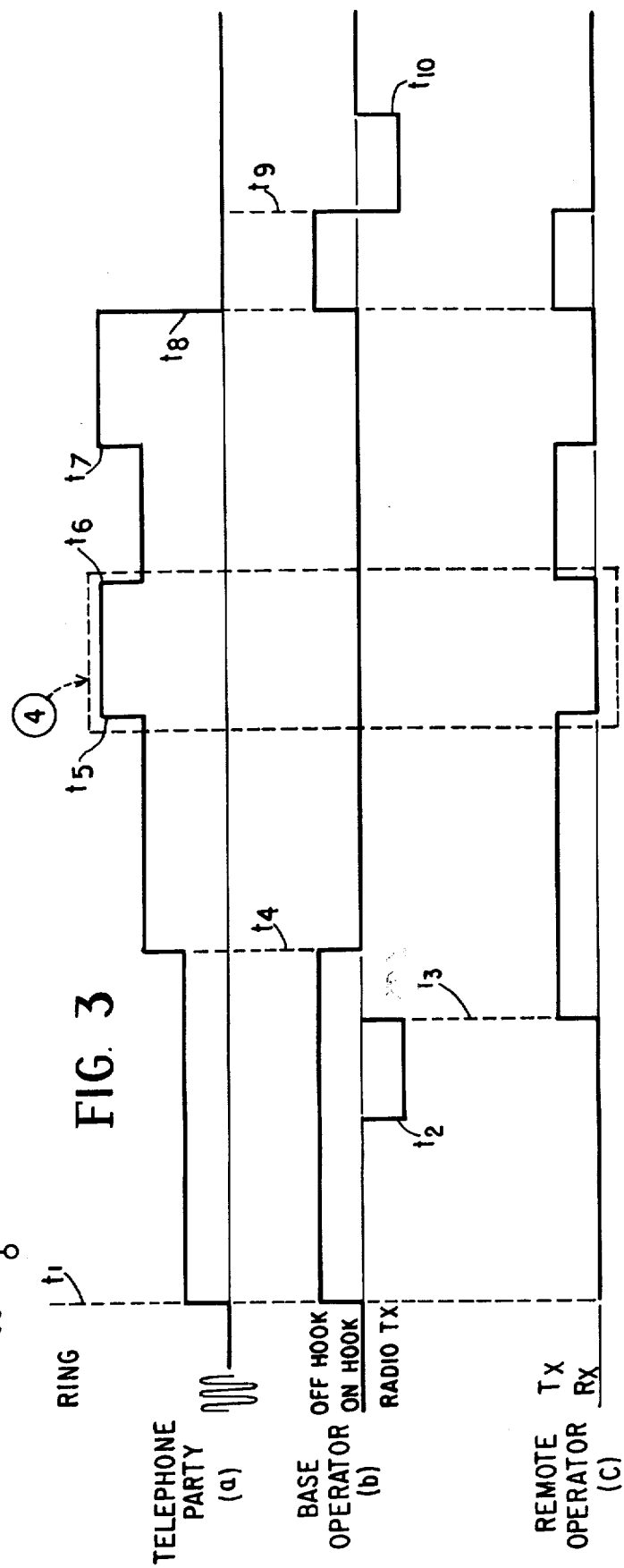
FIG. 1
FIG. 3

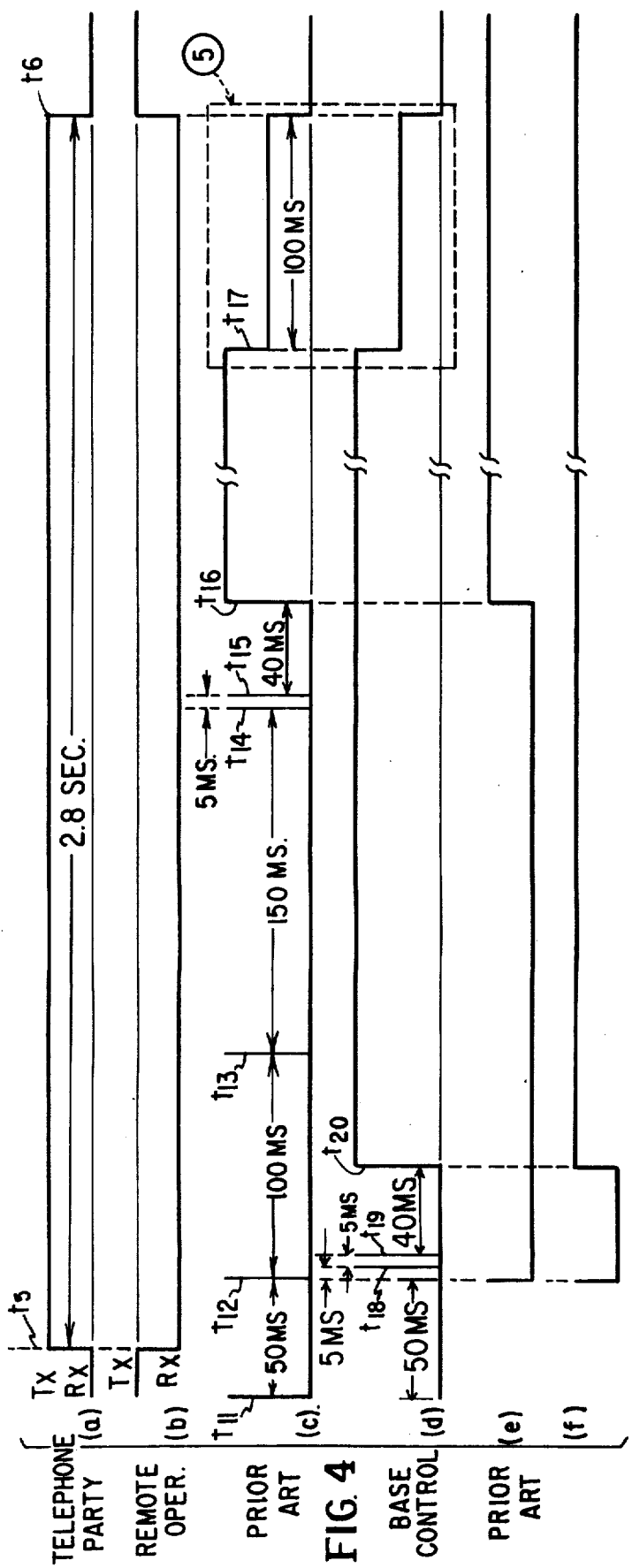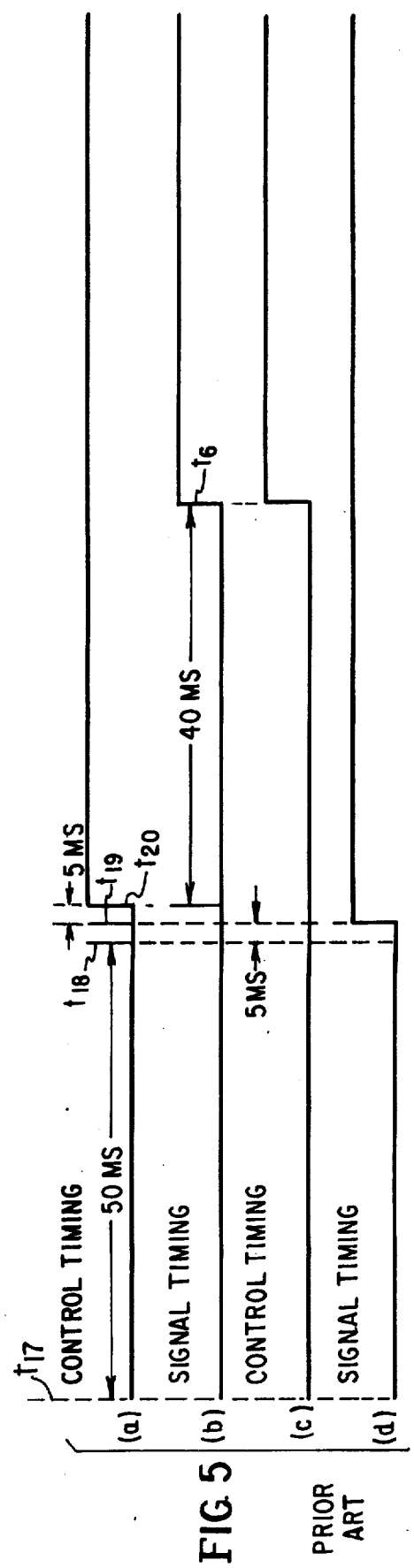

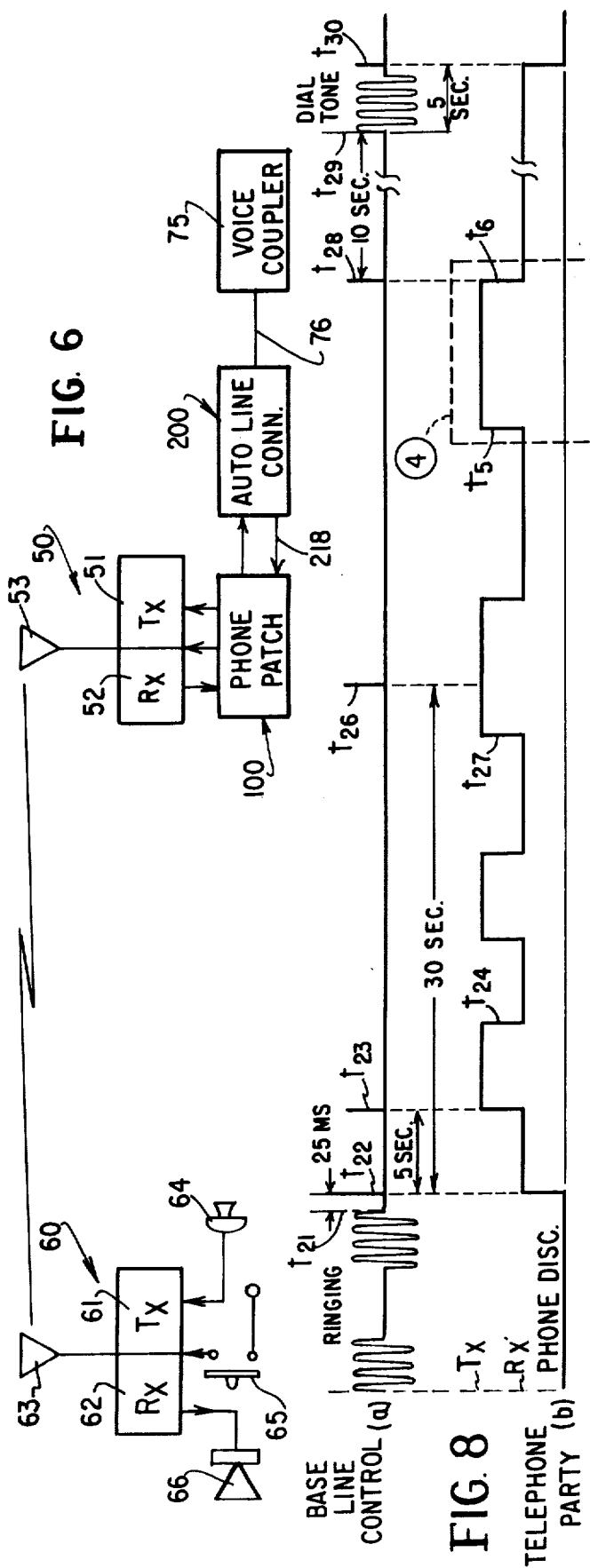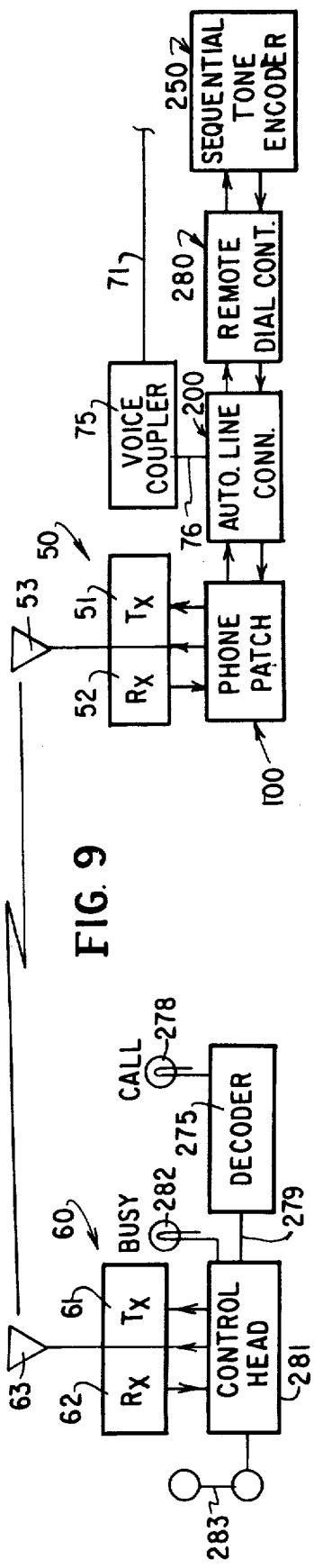

TELEPHONE PATCH

BACKGROUND OF THE INVENTION

This invention relates to the connection between landline telephone networks and two-way radio communication systems typically including a base station and at least one remote station, mobile or otherwise. More particularly, the invention relates to manual and automatic means for providing this interconnection in response to an initiating signal either from a distant telephone network subscriber (hereinafter referred to as the "telephone party") or the operator of a remote radio transceiver. In particular, the invention relates to interconnections between landline telephone networks and simplex radio communication systems.

In the past, most voice communications between landlines and two-way radio systems in the United States have been limited to amateur radio applications and to telephone and radio common carriers. Other services have not generally interconnected between radio systems and landline systems because of various problems associated with implementing these types of systems. In the case of telephone companies, ordinarily full duplex system have been provided. Such systems are, however, very limited in their application because of the lack of mobile-to-mobile capability, and since duplex frequencies are not generally available to most users, such as public safety, industrial, transportation and business radio and other licensees. Additionally, full duplex systems are relatively expensive.

Telephone patching arrangements for simplex radio systems have been utilized in the past, and examples of such prior art systems are disclosed in U.S. Pat. No. 3,557,312 issued to J. H. Vogelman on Jan. 19, 1971 and entitled "Remote Telephone Extension System", and in Canadian Pat. No. 729,289, issued on Mar. 1, 1966 to K. N. Jones, and entitled "Electronic Phone Patch Device". However, such prior art patching systems have incorporated considerable delays in switching between the receive and transmit modes, primarily as a result of the fact that such systems rectify the audio input signal and filter it by an RC bias filter wherein the capacitor has a substantial charging time constant which is in fact utilized to provide a sustain delay to prevent keying of the system on and off between syllables, the filtered signal constituting a control signal for the switching means. Such delays in signal recognition by the prior art systems have prevented them from being used by people who where not experienced with the operation of two-way simplex radio systems and did not have an understanding of the switching intervals involved. In such systems, attempts by inexperienced telephone parties to talk simultaneously with the transmission by the remote radio transceiver result in undesirable loss of information.

This problem is further aggravated by squelch noise which might be presented to or created by the base station receiver voice-operated-switch at the conclusion of a transmission by the remote radio operator. As a result of these factors, the delays in switching between transmit and receive modes or vice-versa in the prior art systems are typically anywhere between 150 and 500 ms, all of which is in addition to the 50 to 300 ms which might be required for the push-to-talk relay in the radio transceiver to operate in response to the switching signal. These delays render the prior art systems unsuitable for use by untrained personnel.

Furthermore, such prior art systems have not been fully automatic and, particularly, have not provided for completely automatic initiation of the phone patch interconnection by a remote radio operator while maintaining control of the interconnection by the radio licensee in accordance with FCC regulations. Therefore, base station operators are needed to complete such interconnections.

In addition, prior art patch systems are subject to being "locked up" by the base station receiver because of spurious signals on the radio communication channel other than those being transmitted from the remote radio operator involved. Thus, "skips", intermodulation and other spurious signals received by the base station receiver could lock out the telephone party and prevent him from gaining access to the base station transmitter.

SUMMARY OF THE INVENTION

The present invention provides an interconnection between a wire telephone line and the base station transmitter and receiver of a simplex two-way radio communication system, wherein the switching between transmit and receive modes and particularly the switching between the base station receive and transmit conditions on cessation of a remote station transmission, occurs in only a few ms, thereby making the switching delays appear more natural to the ordinary user of a telephone system. More particularly, the audio input signal is applied to the switching means without bias filtering having large time delays in capacitive charging, the sustain time being achieved subsequent to the application of the audio input signals to the switching means.

It is another object of this invention to provide a telephone patch system which affords priority to the telephone party, so that whenever he is speaking the base station radio is switched to the transmit mode regardless of whether or not the remote radio operator is transmitting, thereby further enhancing the naturalness of the system to the ordinary telephone party and preventing the telephone line from being locked out by the presence of spurious signals at the base station radio receiver. But at the same time the system will serve to alert the telephone party if he does not follow the one-at-a-time conversation format because he will hear interruptions in the radio remote station transmissions each time the telephone party interrupts.

It is another object of this invention to provide a telephone patch system which automatically connects the telephone line to the base station radio transmitter and receiver upon calling of the base station telephone by another telephone user.

In connection with the foregoing object, it is another object of this invention to provide an automatic telephone patch system of the type set forth, wherein the automatic interconnection may be initiated either by the telephone party or the remote station radio operator.

In connection with the foregoing object, another object of the invention is to provide an automatic telephone patch system which insures access to the patch interconnection by the remote radio operator at predetermined intervals after establishment of the telephone line connection, thereby to provide for control of the telephone line-radio system interconnection by the radio licensee.

Still another object of the invention is to provide an automatic telephone patch system of the type set forth, wherein the base station telephone is automatically disconnected in response to signals from either the radio remote station operator or from the telephone line, or after the expiration of a predetermined time period.

Further features of the invention pertain to the particular arrangement of the parts of the telephone patch system whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a block diagram of a simplex two-way radio communication system, with the base station interconnected to a telephone line by a telephone patch terminal in accordance with the present invention;

FIGS. 3(a), 3(b) and (c) are timing sequence graphs illustrating the relative times at which different operations are performed in accordance with the present invention;

FIGs. 4(a), (b), (d) and 4(f) are more detailed timing sequence graphs illustrating the relative times at which operations are performed in accordance with the present invention in the time period designated by the numeral 4 in FIG. 3, FIGS. 4(c) and 4(e) indicating corresponding time sequences in prior art systems;

FIGS. 5(a) and 5(b) are further detailed timing sequence graphs illustrating the relative times at which operations are performed in accordance with the present invention during the time interval designated by the numeral 5 in FIG. 4, FIGS. 5(c) and 5(d) illustrating the corresponding time sequences in prior art systems;

FIG. 6 is a block diagram, like FIG. 1, illustrating another embodiment of the present invention including an automatic line connector;

FIGS. 8(a) through 8(c) are timing sequence graphs illustrating the relative times at which operations are performed in accordance with the present invention including the automatic line connector;

FIG. 9 is a block diagram, like FIG. 6, illustrating an embodiment of the present invention which includes a mobile dial control unit and base station sequential tone encoder apparatus and complementary equipment at the remote station;

DESCRIPTION OF THE PREFERRED EMBODIMENTS

Figure 2:
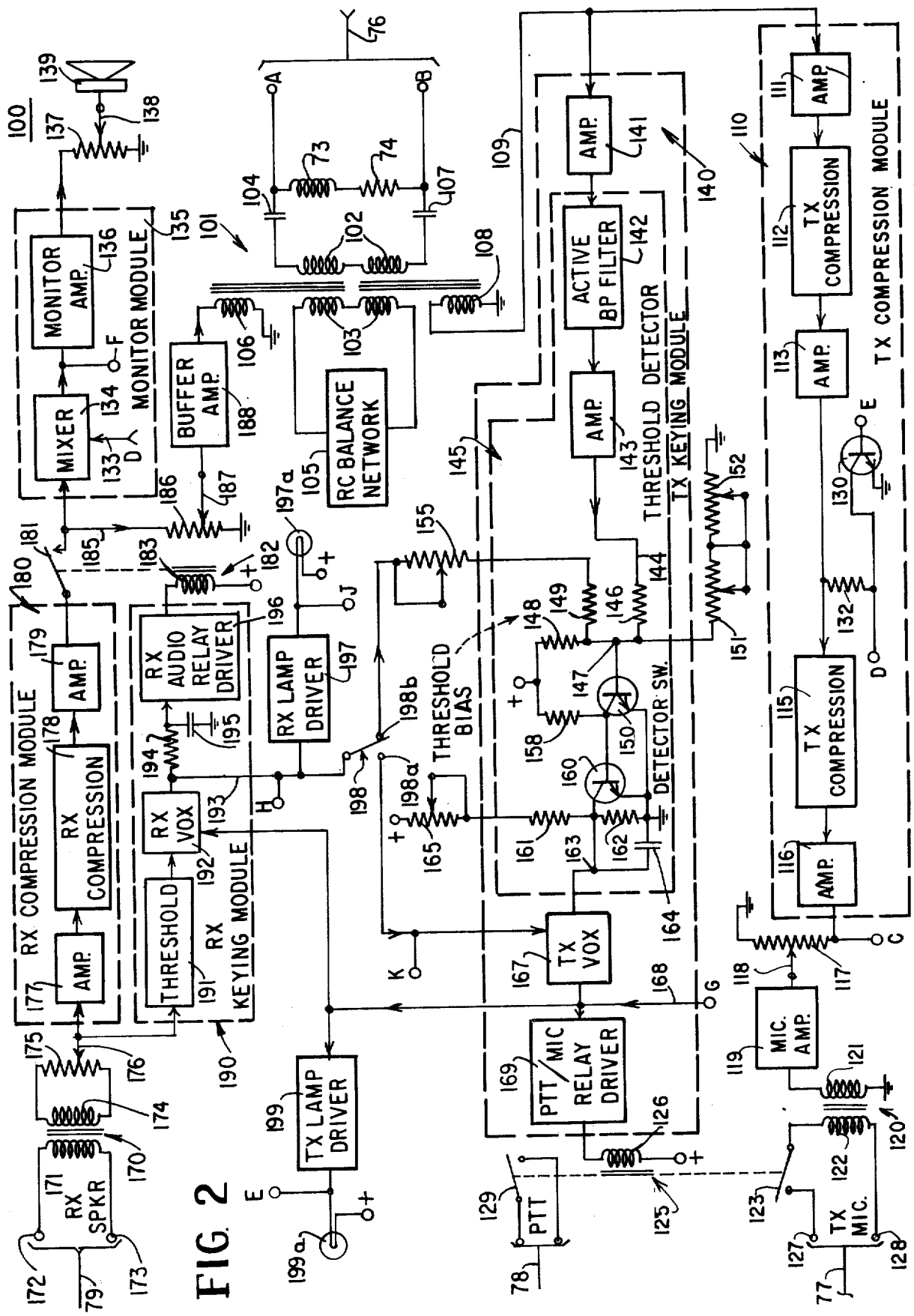
FIG. 2 is a detailed block and schematic diagram of the telephone patch terminal constructed in accordance with and embodying the features of the present invention.

Referring to FIG. 1 of the drawings, there is illustrated a simplex two-way radio communication system including a base station 50 and a remote station 60, the base station 50 having a transmitter 51 and a receiver 52 both coupled to an antenna 53, while the remote station 60 includes a transmitter 61 and a receiver 62, both coupled to an antenna 63, as well as a microphone 64, a push-to-talk switch 65 and a speaker 66. The base station 50 is also provided with a telephone instrument 70 which is coupled to a standard landline telephone communication system, the telephone instrument 70 also being coupled by a line 71 to a voice coupler 75 which is preferably a standard voice coupler as provided by the telephone company. The voice coupler 75 is connected by a line 76 to a phone patch terminal, generally designated by the numeral 100, constructed in accordance with and embodying the features of the present invention. The phone patch terminal 100 is coupled by a line 77 to the audio input of the base station transmitter 51, by a line 78 to the base station push-to-talk switch control, and by a line 79 to the audio output of the base station receiver 52.

Referring now to FIG. 2 of the drawings, the telephone patch terminal 100 is coupled to the voice coupler 75 through a hybrid transformer circuit 101 which includes a pair of series-connected telephone line coil windings 102 connected across terminals A and B which are in turn connected to the two conductors of the voice coupler line 76. Also connected across the terminals A and B is the series combination of a choke coil 73 and a resistor 74 which provide a "hold" circuit for the telephone line in a well-known manner. Respectively connected in series with the terminals A and B between the windings 102 and the hold circuit 7778 are balancing capacitors 104 and 107. The hybrid circuit 101 also includes a pair of balance coil windings 103 connected across a balance network 105, an input coil winding 106 and an output coil winding 108. One terminal of the output coil winding 108 is connected to ground and the other terminal is connected by a line 109 to the inputs of a transmitter compression module, generally designated by the numeral 110, and a transmitter keying module, generally designated by the numeral 140.

More particularly, the transmitter compression module 110 includes an input amplifier 111 having an input coupled to the line 109 and an output coupled to the input of a transmitter compression circuit 112 which limits the output signal amplitude to a fixed amplitude independent of the input signal amplitude. The output of the transmitter compression circuit 112 is coupled to the input of a two-stage amplifier 113, the output of which is coupled to the input of another transmitter compression circuit 115, the output of which is coupled to the input of an amplifier 116. The output of the amplifier 116 is coupled to one end terminal of a microphone potentiometer 117, which end terminal is also connected to a terminal C, for a purpose to be described more fully below. The other end terminal of the potentiometer 117 is connected to ground, the potentiometer 117 being provided with a wiper terminal 118 coupled to the input of a microphone amplifier 119, the output of which is coupled to one terminal of the primary winding 121 of a microphone transformer 120, the other terminal of which winding is connected to ground. The microphone transformer 120 is also provided with a secondary winding 122 having one terminal thereof connected to a transmitter microphone terminal 128, and having the other terminal thereof connected through contacts 123 of a transmitter relay 125 to a transmitter microphone terminal 127, the transmitter microphone terminals 127 and 128 being in turn coupled by line 77 to the base station transmitter 51. The transmitter relay 125 is provided with a coil 126 and with another pair of contacts 129, which are in turn coupled by line 78 to the push-to-talk switch control the base station transmitter 51.

It has been found that by combining the two transmitter compression circuits 112 and 115, a significant increase in signal level at a stabilized output is achieved, and also the circuit tends to reduce the noise component of the audio signal from the telephone line.

The output of the amplifier 113 is also coupled through a resistor 132 to a terminal D and to the collector of a transistor 130, the emitter of which is grounded and the base of which is coupled to a terminal E. Referring to the top of FIG. 2, the terminal D is coupled to a monitor module, generally designated by the numeral 135. More particularly, the terminal D is coupled by a conductor 133 to a transmitter input of a mixer 134, the output of which is coupled to the input of a monitor amplifier 136. The output of the monitor amplifier 136 is coupled to one end terminal of a potentiometer 137, the other end terminal of which is grounded, the potentiometer 137 also having a wiper 138 connected to a monitor speaker 139. The output of the mixer 134 is also coupled to a terminal F for a purpose to be described below. In operation, the audio output from the amplifier 113 is inhibited from the terminal D by the operation of the transistor 130, thereby muting the transmitter audio at the monitor speaker 139. As will be described below, when the base station transmitter is keyed on by voice signals from the telephone line, a signal will be applied to terminal E, turning off the transistor 130 and permitting the output from the amplifier 113 to be fed to the monitor module 135.

The transmitter keying module 140 includes an input amplifier 141, the input of which is coupled to the line 109 and the output of which is coupled to the input of a threshold detector, generally designated by the numeral 145. The threshold detector 145 includes an active band-pass filter 142 which has a 3 db bandwidth of 600 Hz. centered at the frequency at which the level of audio signal reflected through the hybrid transformer 101 from the input coil winding 106 to the output coil winding 108 will null or be a minimum, which in a constructional example of the present invention is about 700 Hz., the midpoint of the first harmonic band of voice signals. There is also provided at the output of the active band-pass filter 142 a low-pass R-C spike suppressor (not shown) for suppressing any spikes due to power supply noise on the band-pass filter, and pulses and high frequency noise on the telephone line. The output of the active band-pass filter is coupled to the input of a class C amplifier 143, the output of which is coupled by a conductor 144 to a resistor 146 which is in turn connected by a conductor 147 to the junction between resistors 148 and 149 and to the base of a transistor 150. The conductor 147 is also connected to one end terminal of a keying sensitivity potentiometer 151, the other end terminal of which is connected to one end terminal of a keying sensitivity potentiometer 152, the other end terminal of which is connected to ground. The potentiometers 151 and 152 are respectively provided with wiper terminals 153 and 154, both of which are connected to the junction between the two potentiometers. The resistor 148 is connected to a positive voltage supply while the resistor 149 is connected to one end terminal of a threshold potentiometer 155. The collector of the transistor 150 is connected through a resistor 158 to positive voltage supply and is also connected to the base of a transistor 160, the emitters of the transistors 150 and 160 being connected to ground. The collector of the transistor 160 is connected to a resistor 161 which is in turn connected to one end terminal of a transmitter sustain potentiometer 165. The collector of the transistor 160 is also connected to an output conductor 163 which is connected to the input of a transmitter voice-operated switch ("VOX"). Connected across the emitter-collector junction of the transistor 160 is a parallel combination of a resistor 162 and a capacitor 164. The potentiometers 151, 152 and 155 and the resistors 148 and 149 constitute a bias circuit for establishing the threshold level of the threshold detector 145, while the transistors 150 and 160 and capacitor 164 constitute a detector switch.

The output of the transmitter VOX is coupled to the input of a push-to-talk/microphone relay driver 169, the output of which is coupled to one terminal of the transmitter relay coil 126, the other terminal of which is connected to positive voltage supply. The output of the transmitter VOX 167 is also coupled by a conductor 168 to a terminal G for a purpose to be described below.

In operation, the audio input signal from the telephone line is band-pass filtered by the filter 142, the filtered signal being applied to the class C amplifier 143, the output of which is predominantly negative-going. This negative-going signal is applied to the biasing circuitry for the transistor 150 and trips the bias below a predetermined triggering or threshold level, which level is normally determined by the resistor 148 and the potentiometers 151 and 152, and which is adjustable by appropriate settings of these potentiometers to provide for compensation for extremely noisy phone line conditions. The audio signal detected at the base of the transistor 150 serves to turn off the transistor 150 and turn on the transistor 160. The capacitor 164 is charged to a predetermined voltage level through the resistor 161 and the potentiometer 165, and this charge normally serves to maintain the transmitter VOX 167 in an off condition, holding the transmitter relay coil 126 de-energized and maintaining the relay contacts 123 and 129 open. When the transistor 160 is turned on, however, a short is provided therethrough bypassing the resistor 162 for virtually instantaneous discharge of the capacitor 164, thereby immediately turning the transmitter VOX 167 on and closing the relay contacts 123 and 129. The recharging time of the capacitor 164 is controlled by the resistor 161 and the sustain potentiometer 165, and is manually adjustable by appropriate setting of the sustain potentiometer 165.

It is a significant feature of the present invention that the threshold detector 145 does not include any bias-type filtering with its attendant delays, as in prior art systems. Thus, the audio input signal from the telephone line is band-pass filtered and class C amplified and applied directly to the base of the transistor 150, the delay between the output of the amplifier 141 and the input to the base of the transistor 150 being no greater than about five ms. The sustain time is achieved by recharging of the capacitor 164 after the keying function has been accomplished.

The base station receiver 52 is coupled by line 79 to the terminals 172 and 173 of a primary winding 171 of a receiver speaker transformer 170 which is also provided with a secondary coil 174 connected across the end terminals of a receive level potentiometer 175. The potentiometer 175 has a wiper terminal 176 which is coupled to the inputs of a receiver compression module, generally designated by the numeral 180, and a receiver keying module, generally designated by the numeral 190.

More particularly, the receiver compression module 180 includes an input amplifier 177, the input of which is coupled to the conductor 176 and the output of which is coupled to the input of a receiver compression circuit 178 having an output coupled to the input of an amplifier 179. Preferably, the receiver compression circuit 178 is substantially the same as the transmitter compression circuits 112 and 115. The output of the amplifier 179 is connected through the contacts 181 of a receiver relay 182 to a receiver audio input of the mixer 134 of the monitor module 135. The relay 182 has a coil 183.

The relay contacts 181 are also connected by a conductor 185 to one end of a telephone line level potentiometer 186, the other end terminal of which is connected to ground. The potentiometer 186 has a wiper terminal 187 which is coupled to the input of a telephone line buffer amplifier 188, the output of which is connected to the ungrounded terminal of the input coil winding 106 of the hybrid transformer circuit 101. The purpose of the buffer amplifier 188 is to match the output impedance of the amplifier 179 to the input impedance of the hybrid transformer circuit 101.

The receiver keying module 190 includes a threshold detector 191 which is essentially the same as the threshold detector 145 except for the biasing circuitry, and which has an input coupled to the potentiometer wiper terminal 176 and an output coupled to an input of a receiver voice-operated switch (VOX) 192. The output of the receiver VOX 192 is coupled by a conductor 193 to a terminal H, for a purpose to be described below, and is also connected through a resistor 194 to one terminal of a capacitor 195 the other terminal of which is grounded, and to the input of a receiver audio relay driver 196, the output of which is connected to the one terminal of the receiver relay coil 183, the other terminal of which is coupled to positive voltage supply. The conductor 193 is also connected to the input of a receiver lamp driver 197, the output of which is coupled to a terminal J, for a purpose to be described below, and to a lamp 197a which is in turn connected to positive voltage supply. The conductor 193 is also coupled to the movable contact of a mode selector switch 198 which has a fixed contact 198a coupled to a control input of the transmitter VOX 167 and to a terminal K, and a fixed contact 198b coupled to the other end terminal of the threshold potentiometer 155.

The conductor 168 at the output of the transmitter VOX 167 is also coupled to a control input of the receiver VOX 192 and to the input of a transmitter lamp driver 199, the output of which is coupled to the terminal E and to a lamp 199a which is in turn coupled to positive voltage supply.

The switching circuitry of the present invention is capable of responding in a matter of microseconds, but in order to prevent the system from responding to noise spikes and the like, capacitive delays of not greater than one ms (not shown) are preferably employed at the control inputs of the transmitter VOX 167 and the receiver VOX 192 and between the mode selector switch 198 and the potentiometer 155.

The mode selector switch 198 can be manually shifted between a first position closing a circuit to the fixed contact 198a for a conventional "anti-VOX" mode of operation, and a second condition closing a circuit to the fixed contact 198b for a telephone line priority mode of operation. In the anti-VOX mode of operation, which is a conventional mode of operation used in prior art systems, the output signal from the receiver VOX 192 is applied to the control input of the transmitter VOX 167 for disabling same to prevent energization of the transmitter relay 126. In like manner, it will be understood that when voice signals are being transmitted from the telephone line through the transmitter keying module 140, the transmitter VOX 167 produces an output signal which is applied via the conductor 168 to the control input of the receiver VOX 192 for disabling same and preventing energization of the receiver relay 182. Thus, in the anti-VOX mode of operation, when the remote station operator is talking, the transmitter is off and the transmit audio path from the telephone line through the telephone patch terminal 100 to the base station transmitter 51 is open, thereby preventing the telephone party from interrupting the remote station operator. In like manner, when the telephone party is talking, the receiver is off and the receive audio path from the base station receiver 52 through the telephone patch terminal 100 to the telephone line is open, thereby preventing the remote station operator from interrupting the telephone party. It is contemplated that the anti-VOX mode of operation would seldom be used with the present invention, and that normally it would be operated in the telephone line priority mode of operation.

Referring now also to FIGS. 3, 4 and 5 of the drawings, the operation of the telephone patch terminal 100 in the telephone priority mode of operation will now be described in detail. The beginning of a conversation between a telephone party and a radio remote station operator equipped with a standard simplex push-to-talk two-way radio, begins with the telephone party dialing the telephone number of the radio base station office where the telephone patch terminal 100 is located. The sequence of subsequent events is diagrammatically illustrated in the timing sequence graphs of FIGS. 3(a) through (c), FIG. 3(a) indicating the activity at the telephone party's telephone, FIG. 3(b) indicating the activity at the radio system base station 50, and the FIG. 3(c) indicating the activity at the radio system remote station 60. When the telephone at the base station 50 rings, the base station operator answers the telephone in the normal manner at time $t_1$, thereby completing a voice communication path between the telephone party and the base station operator.

The base station operator then converses with the telephone party to determine which remote station operator he desires to talk to and, at time $t_2$, the base station operator contacts the desired remote station operator by means of the radio system. At the time $t_3$, the base station operator completes his radio transmission, and the remote station operator transmits a reply, indicating whether or not he wishes to speak with the calling telephone party. If the remote station operator desires to talk to the telephone party, at time $t_4$ the base station operator connects his telephone line with the telephone patch terminal 100 by connecting the line 76 to the hybrid transformer circuit terminals A and B, and hangs up his telephone handset, the telephone connection bypassing the base station telephone hook switch and being held through the choke coil 73 and the resistor 74 in a well-known manner.

Thus, at time $t_4$, a voice path is completed from the base station receiver audio output through the telephone patch terminal 100 to the telephone line, and a voice path is completed from the telephone line through the telephone patch terminal 100 to the base station transmitter audio input. Since the radio remote station 60 is in the transmit mode, the remote station operator immediately begins to transmit to the telephone party and explains that the following conversation must be conducted in one direction at a time in accordance with normal two-way radio operation, so that the telephone party will not try to talk at the same time the radio remote station operator is talking.

The voice signals from the remote station operator are received at the base station receiver 52 and are coupled through the receiver speaker transformer 170 to the receiver compression module 180, where the speech signals are compressed, and also to the receiver keying module 190. The threshold of the threshold detector 191 is set at a level to distinguish between voice signals from the remote station and spurious signals such as noise and the like, the voice signals exceeding the threshold and producing an output signal which triggers the receiver VOX 192 with the same minimal time delay as the transmitter threshold detector 145 to generate an output signal which in turn triggers the receiver audio relay driver 196 after a predetermined delay created by the resistor 194 and capacitor 195 to energize the relay 182 and close the normally open relay contacts 181. The output signal from the receiver VOX 192 also energizes a receiver lamp driver 197 via the conductor 193 for lighting an indicating lamp 197a to indicate to the base station operator that voice signals are being received from the remote station.

The output signal from the receiver VOX 192 is also applied via the conductor 193 to the mode selector switch 198, which is now in its second condition, illustrated in FIG. 2, closing a circuit to the fixed contact 198b for the telephone line priority mode of operation.

When the receiver relay contacts 181 are closed, the voice signals from the remote station are transmitted through the potentiometer 186 and the buffer amplifier 188 and the hybrid transformer circuit 101 to the telephone line for reception by the telephone party. The received voice signals are also transmitted to the monitor module 135 and the monitor speaker 139 so that the base station operator can monitor the conversation, any audio signals being received from the telephone line at this time being muted at the monitor module 135 by the operation of the transistor 130, as was described above.

When the ratio remote station operator has completed his transmission, the absence of voice signals at the input of the threshold detector 191 turns off the receiver VOX and in turn de-energizes the receiver lamp driver 197 and the receiver audio relay driver 196, thereby de-energizing the receiver relay 182 and reopening the relay contacts 181 for disconnecting the base station receiver 52 from the telephone line. This time is designated as $t_5$ in FIG. 3 and at that time the telephone party may begin talking, his voice signals being transmitted from the telephone line through the hybrid transformer circuit 101 to the inputs of the transmitter compression module 110 and the transmitter keying module 140. The voice signals from the telephone line are compressed in the transmitter compression module 110 and are the applied through the microphone potentiometer 117, the microphone amplifier 119, the microphone transformer 120 and the transmitter relay contacts 123 to the transmitter microphone audio input terminals via the line 77.

The voice signals from the telephone line are also applied to the active band-pass filter 142 of the transmitter keying module 140 through the amplifier 141. The active band-pass filter 142 is for the purpose of distinguishing between voice signals from the telephone line and signals which might be reflected or fed back through the hybrid transformer circuit 101 from the receiver audio path. More particularly, the hybrid transformer circuit 101 is for the purpose of isolating the receiver audio path through the winding 106 to the windings 102 and the telephone line from the transmitter audio path which goes from the telephone line and the windings 102 to the winding 108 and the radio transmitter. In order to accomplish this, the hybrid transformer circuit is balanced by means of the balance network 105 and the capacitors 104 and 107 with respect to the telephone line impedance.

While this balance adjustment minimizes the level of reflected or feedback signals between the transmitter and receiver audio paths, it does not completely eliminate such reflections. Indeed, when the hybrid transformer circuit 101 is balanced to its lowest possible null point at the lowest possible frequency (approximately 600–800 Hz.), the reflection will be minimal at the null frequency, but will increase substantially as the frequency varies above and below the null frequency. Thus, the active band-pass filter 142 has a 600 Hz. bandwidth centered at 700 Hz., the approximate null frequency of the hybrid transformer circuit 101, this being the range of frequencies in which any reflected signals from the receiver audio path will be at their lowest level and thus, in this passband, voice signals from the telephone line are most easily distinguished from reflected signals from the receiver audio path.

The output of the active band-pass filter 142 is applied to the amplifier 143 through a spike suppressor (not shown) as was described above, and thence to the threshold circuit of the threshold detector 145. The audio signals are applied through the resistor 146 to the base of the transistor 150 which is normally biased on, the basic biasing network including the resistor 148 and the potentiometers 151 and 152. If the audio input signal at resistor 146 is of a level sufficient to overcome the transistor bias, the transistor 150 will be turned off, thereby turning on the transistor 160 for substantially instantaneous discharge of the capacitor 164 to ground and gating on of the transmitter VOX 167 for energizing the relay driver 169 and the transmitter relay 125, thereby closing the relay contacts 123 and 129, all as was described above. This applies the voice signal from the telephone line to the audio input of the base station transmitter 51 and closes the transmitter push-to-talk switch for transmission of the audio signals to the radio remote station.

The output from the transmitter VOX 167 also energizes the transmitter lamp driver 199 and the lamp 199a via the conductor 168 for indicating to the base station operator that the transmitter is operating. The output from the transmitter VOX 167 is also applied to the control input of the receiver VOX 192 for disabling same. Thus, while the telephone party is talking, the receiver audio path through the telephone patch terminal 100 is broken so that the telephone party cannot be interrupted by the radio remote station operator.

As soon as the capacitor 164 is discharged, it will immediately begin to be recharged and when it has been fully recharged, it will again turn off the transmitter VOX 167. The recharge time of the capacitor 164 is controlled by the resistor 161 and the sustain potentiometer 165. The potentiometer 165 is manually adjusted so that during normal conversation there will be enough delay in charging of the capacitor 164 so that the transmitter does not drop out between words, but the delay being small enough to insure that the transmitter VOX 167 is turned off and the receive VOX is again enabled prior to the beginning of transmission by the radio remote station operator, so that no portion of the receive signal is cut out. It is significant that the amplifier 143 is a non-linear amplifier which operates like a class C amplifier to produce disproportionate amplification of the negative-going portion of the audio signals to provide a control signal for overcoming the threshold bias of the transistor 150 without limiting or bias filtering.

When the mode selector switch 198 is in the position illustrated in FIG. 2, closing the circuit to the fixed contact 198b, the system is in the telephone line priority mode of operation. In this mode, the output of the receiver VOX 192 is not connected to the control input of the transmit VOX 167, whereby the transmit path is not automatically disabled whenever audio signals are being received from the radio remote station. Rather, the output of the receiver VOX 192 is connected to the threshold potentiometer 155, thereby adding the potentiometer 155 and the resistor 149 to the biasing circuit for the transistor 150. This serves to increase the biasing on the transistor 150 and thereby increase the threshold level of the threshold detector 145, whenever audio signals are being received from the radio remote station. This threshold level is adjusted so that it will be just above the level of reflected signals from the receiver audio path to the transmitter audio path through the hybrid transformer circuit 101. Thus, any audio signals appearing at the input of the threshold detector 145 which exceed this increased threshold may be assumed to be signals from the telephone line, and not reflected signals from the receiver audio path.

Since voice signals from the telephone party and tone signals from the telephone line will normally exceed the level of reflected signals from the receiver audio path, such audio signals from the telephone line will serve to operate the threshold detector 145 and gate on the transmitter VOX 167 in the manner described above. Thus, in this mode of operation, the telephone party has priority and he may interrupt and override the transmissions from the radio remote station. This will insure that the transmission from the telephone party, who is assumed to be the party least famililar with the operation of the two-way radio system, will not be lost. In this regard, it will be noted that the output from the receiver VOX 192 is applied to the receiver audio relay driver 196 through the combination of the resistor 194 and capacitor 195, the values of which are selected so that the energization of the receiver audio relay driver 196 will be delayed a short predetermined time, preferably approximately forty ms, sufficient to insure that, in the telephone line priority mode of operation, the threshold level of the threshold detector 145 will be raised before the received audio signals are applied through the receiver relay contacts 181 to the hybrid transformer circuit 101.

In addition, it will be noted that when the telephone party is talking, a signal will be applied to the terminal E from the output of the transmitter lamp driver 199 and thence to the base of the transistor 130 for opening the path from the output of the amplifier 113 to the input of the mixer 133 via terminal D, so that the base station operator may monitor the transmissions of the telephone line subscriber. It will be appreciated that a significant advantage of the telephone priority mode of operation is that the telephone party can talk at any time and his transmissions will not be lost, thus facilitating use of the system by an untrained telephone party.

Referring again to FIG. 3, when the telephone party has completed his transmission at $t_6$, the absence of audio signal is sensed by the threshold detector 145 and the capacitor 164 is permitted to recharge in the predetermined sustain time, thereby gating off the transmitter VOX 167, de-energizing the relay driver 169 and transmitter relay 125 and the transmitter lamp driver 199, and re-enabling the receiver VOX 192. Alternating transmissions by the radio remote station and the telephone party then continue in normal fashion, the last transmission by the telephone party beginning at $t_7$ and ending at $t_8$. At or about time $t_8$, the base station operator disconnects the telephone line from the telephone patch terminal 100, then picks up his telephone handset and acknowledges the end-of-transmission message by the telephone party. At $t_9$ the base station operator hangs up his telephone handset and transmits to the radio remote station operator a message that the telephone line interconnection has been terminated, this message ending at $t_{10}$.

It is a significant feature of the present invention that the switching between transmit and receive modes by the telephone patch terminal 100 is accomplished very fast with substantially less delay than occurs in prior art systems. Referring to FIG. 4, the portion of FIG. 3 designated by the numeral 4 has been expanded to illustrate the details of the time sequence in keying between the transmitter 51 and receiver 52 at the base station 50. FIG. 4(a) illustrates events at the calling party station, i.e., the telephone party, FIG. 4(b) illustrates events at the radio remote station, FIGS. 4(c) and (d) respectively illustrate events at the base station in prior art systems and in the system of the present invention, while FIGS. 4(e) and (f), respectively, illustrate the minimum loss of conversation time in prior art systems and in the system of the present invention.

Referring to FIG. 4(c), the end of the sentence by the radio remote station operator occurs at time $t_{11}$, after which the prior art systems encounter approximately a fifty ms mental reaction delay before the telephone party can begin talking at $t_{12}$. But there is normally associated with the turnoff of the radio remote station transmitter a receiver squelch time at the base station which lasts at least one hundred ms, and can be much longer if there is any co-channel interference. These spurious signals prevent the prior art patch systems from recognizing the beginning of audio transmission by the telephone party for keying the base station transmitter on and keying the base station receiver off. At $t_{13}$, when the squelch noise ceases, the prior art systems are capable of recognizing transmissions from the telephone line, but the prior art recognition circuitry includes audio signal bias filtering means which has inherent delay times of up to 150 ms to $t_{14}$ before the rectified audio signal is presented to the transmitter VOX. The keying operation by the transmitter VOX takes about 5 ms to $t_{15}$, after which the time required for energization and operation of the transmitter relay is about forty ms to $t_{16}$, at which time the telephone party's voice signals are actually presented to the base station radio transmitter. Thus, referring to FIG. 4(e), in prior art systems the minimal loss of conversation time from $t_{12}$, when the telephone party can first begin talking, to $t_{16}$ when his voice signals are first applied to the base station ratio transmitter, is approximately 300 ms.

Referring now to FIG. 4(d), in the system of the present invention there will also normally be approximately a 50 ms mental reaction time for the telephone party to realize that the radio remote station transmission has ended. Thus, for all practical purposes, in the system of the present invention, as well as in the prior art systems, the telephone party can first begin talking at $t_{12}$, although in the telephone priority mode of operation the telephone subscriber in the present invention can begin talking at any time. In the present invention the audio signals from the telephone line are not rectified, but rather the unrectified signals are applied directly to the base of the transistor 150 in the threshold detector 145, with a signal recognition time delay of no more than about 5 ms to $t_{18}$. The actual keying time of the transistors 150 and 160 and the transmitter VOX 167 is no more than about 5 ms to $t_{19}$, and the present invention also requires a 40 ms delay to $t_{20}$ for energization and closing of the transmitter relay 125. Thus, referring to FIG. 4(f), in the system of the present invention, the total loss of conversation from $t_{12}$ to $t_{20}$ is only about 50 ms. This significant decrease in keying time, together with the telephone priority mode of operation made possible by the present invention, results in a much more natural type of conversation for the average telephone party.

When the telephone party has completed his transmission at $t_{17}$, both the present invention and the prior art systems provide for a variable sustain and keying time averaging about 100 ms before the transmitter is keyed off and the receiver is allowed to be keyed on, the sustain time being provided by the sustain potentiometer 165 as was described above. However, further advantages in the keying off of the transmitter are realized in the present invention, as is more clearly indicated in FIG. 5, which is an expanded view of the portion of the time sequence designated by the numeral 5 in FIGS. 4(c) and (d). FIGS. 5(a) and (b) respectively illustrate the control timing sequence and the signal timing sequence in the present invention, while FIGS. 5(c) and (d) respectively illustrate the same time sequences in the prior art systems.

Referring first to FIGS. 5(a) and (b), the sustain time from $t_{17}$ to $t_6$ as illustrated in FIG. 4(d) is seen to be comprised of several subintervals. After the calling telephone party completes his sentence at $t_{17}$, the actual transmitter sustain time provided by the sustain potentimeter 165 is approximately 50 ms to $t_{18}$. At that time the transmitter VOX 167 is gated on, the keying time being about 5 ms to $t_{19}$. This enables the receiver VOX 192, after which there is a received signal recognition time of about 5 ms for the received signal to be recognized by the threshold 191 and for the switching signal to be presented at the output of the receiver VOX 192. At this point, the receiver lamp driver 197 is energized at $t_{20}$, but there is a deliberate delay of about 40 ms introduced by the resistor 194 and capacitor 195 before the receiver relay 182 is energized to provide a receiver audio path to the telephone line at $t_6$. As was described above, this 40 ms delay time permits the threshold of the threshold detector 145 in the transmitter keying module 140 to be adjusted, before the received audio signal is applied to the hybrid transformer circuit 101.

Referring now to FIGS. 5(c) and (d), it will be seen that the prior art systems utilize the same 50 ms transmitter sustain time, and require the same 5 ms keying time for keying the transmitter off. However, in the prior art systems, since the telephone receiver of the telephone party is always connected, the receiver audio path is connected to the telephone line immediately at $t_{19}$, but the keying circuitry of the prior art system requires at least 45 ms to $t_6$, and perhaps as much as 150 ms, as was described above with respect to FIG. 4, in order to recognize the received signal and present it to the receiver VOX, at which time the receiver light control is energized. In the meantime, any squelch noise or other spurious signals being received at the base station are applied to the telephone line and are heard by the telephone party, thereby causing unpleasant communications and perhaps serving to confuse the telephone party.

It will, of course, be appreciated that while the system has been described with the call originating with the telephone party, the radio remote station operator could also originate a call by transmitting to the base station operator that he wishes to talk to a particular telephone party, whereupon the base station operator would dial the telephone party's number, advise the telephone party of the waiting call and the nature of the interconnection, then connect the telephone line to the telephone patch terminal 100 and hang up the base station telephone and the conversation would proceed in the manner described above. It will also be understood that because the interconnection must be manually made by the base station operator, who monitors both sides of the conversation the interconnection is at all times under the control of the radio licensee.

Figure 7:
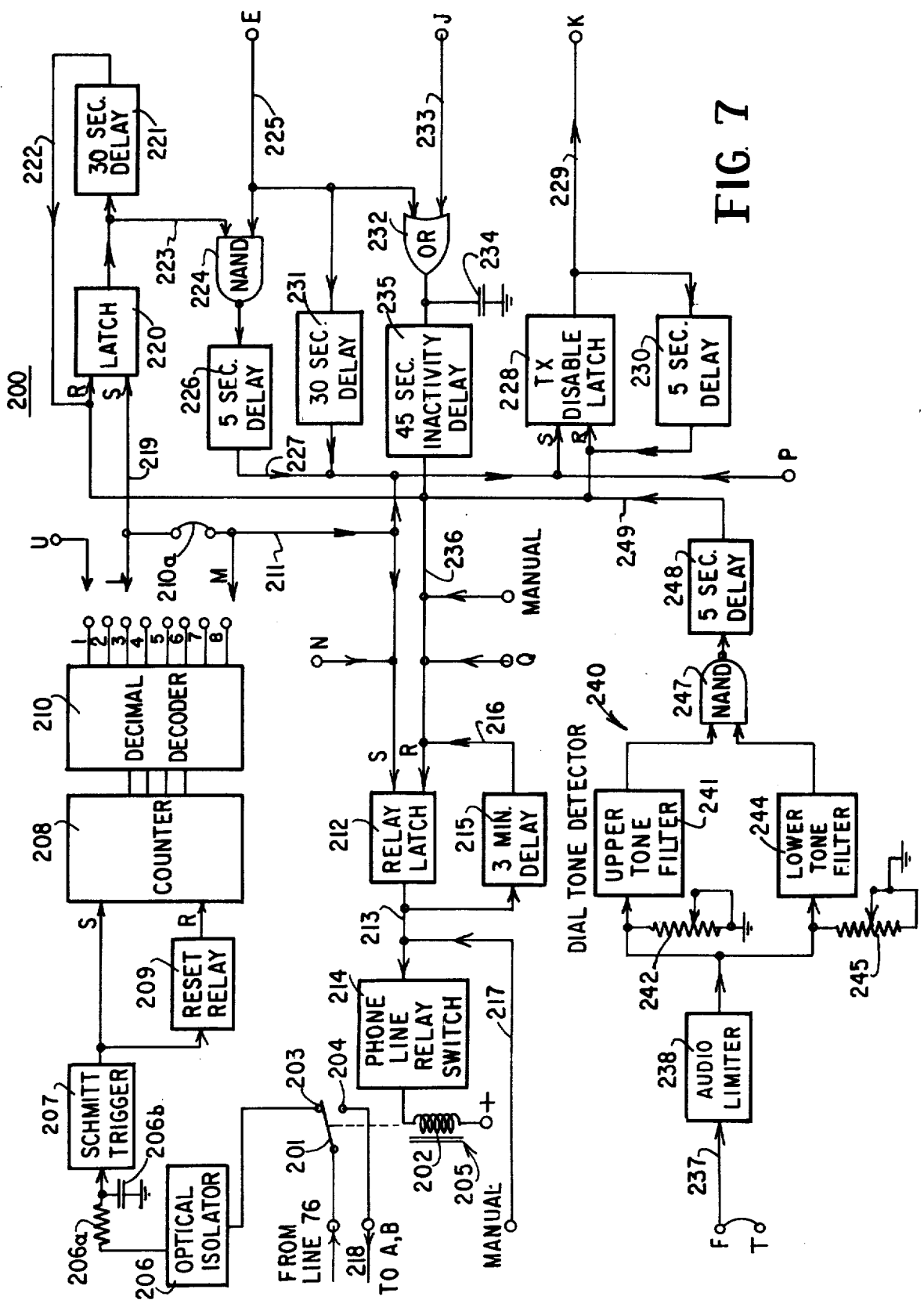
FIG. 7 is a detailed block and schematic diagram of the automatic line connector illustrated in FIG. 6.

Referring now to FIGS. 6 and 7 of the drawings, there is illustrated another embodiment of the present invention wherein the voice coupler 75 at the radio base station 50 is coupled to the telephone patch terminal 100 through an automatic line connector, generally designated by the numeral 200, which permits the telephone patch interconnection to be automatically completed when a call originates with the telephone party. The automatic line connector 200 includes a telephone line relay, generally designated by the numeral 205, which has a coil 202 and a set of contacts including movable contacts 201 and fixed contacts 203 and 204. It will be noted that while the relay 205 is diagrammatically shown as having a single pole, it will be understood that the line 76 has two conductors and that the relay 205 is in actual construction a multiple pole, double-throw relay. In its normally de-energized condition, the relay 205 is in the position illustrated in FIG. 7, with the movable contacts 201 in engagement with the fixed contacts 203, the movable contacts 201 being connected to the line 76 from the telephone voice coupler 75, and the fixed contacts 203 being coupled to the input of an optical isolator 206, the output of which is coupled through an RC low pass filter including a resistor 206a and a capacitor 206b to the input of a Schmitt trigger 207, so that for each ring signal an essentially D.C. voltage level is presented to the input of the Schmitt trigger 207. The output of the Schmitt trigger 207 is coupled to the set or clock input of a counter 208 for pulsing the counter and is also coupled to the input of a reset delay timer 209, the output of which is coupled to the reset input of the counter 208 to reset the counter 208 a predetermined time after it is set. The counter 208 counts the number of ringing signals from the telephone line and produces a binary-coded, decimal output which is coupled to the input of a decimal decoder 210 which produces a decimal output signal corresponding to the number of ring signals detected. Terminals L and M are coupled to a selected one of the decimal decoder output terminals corresponding to the selected number of ring signals after which the automatic line connector 200 is intended to be responsive. For example, if the system is intended to respond after two ringing signals have been detected, the terminals L and M are coupled to the output 2 of the decimal decoder 210. The terminals L and M may be coupled together by a jumper conductor 210a which, in this embodiment of the invention, is disconnected.

The terminal M is coupled by a conductor 211 to the set input of a relay latch 212, the output of which is coupled by a conductor 213 to the input of a telephone line relay switch 214, the output of which is coupled to one terminal of the telephone line relay coil 202, the other terminal of which is coupled to positive voltage supply. Thus, after two ring signals have been detected, the relay latch 212 is set, producing an output signal which turns on the telephone line relay switch 214 to generate an output signal which energizes the relay coil 202 for moving the movable contacts 201 out of engagement with the fixed contacts 203 and into engagement with the fixed contacts 204, which are coupled by a line 218 to the telephone line terminals A and B of the hybrid transformer circuit 101 of the telephone patch terminal 100. Thus, the telephone line is automatically disconnected from the optical isolator 206 and connected to the telephone patch terminal 100 for completing the patch interconnection without the assistance of a base station operator.

The conductor 213 at the output of the relay latch 212 is also coupled to the input of a three-minute delay timer 215, the output of which is coupled by a conductor 216 to a reset input of the relay latch 212. Thus, three minutes after the telephone line connection has been automatically completed, the relay latch 212 will be reset and the telephone line relay 205 de-energized for automatically disconnecting the telephone line from the telephone patch terminal 100, regardless of any activity by either party to the conversion. A three-minute time limit is thus imposed on the telephone patch interconnection. It will be understood that any other desired time limit could be placed on the interconnection but it will normally be between two and five minutes. The conductor 213 is also coupled by a conductor 217 to a manual control switch (not shown) for manually controlling the actuation of the telephone line relay switch 214 and the operation of the telephone line relay 205.

The conductor 211 is also coupled to a terminal N, for a purpose to be described below, and to a set input of a transmitter disable latch 228, which set input is also coupled to a terminal P. The output of the transmitter disable latch 228 is coupled by a conductor 229 to the terminal K, which is coupled to the control input of the transmitter VOX 167 (see FIG. 2). The output signal from the transmitter disable latch 228 serves to turn off or disable the transmitter VOX 167, thereby turning off the relay driver 169 and de-energizing the transmitter relay 125 and opening the relay contacts 123 and 129 for disabling the transmitter audio path through the telephone patch terminal 100. The transmitter VOX 167 will remain disabled until the disable signal is removed from its input. The output of the transmitter disable latch 228 is also coupled to the input of a five-second delay timer 230, the output of which is coupled to a reset input of the transmitter disable latch 228. Thus, five seconds after it is set, the transmitter disable latch 228 will be reset for removing the output signal thereof from the terminal K and permitting the transmitter VOX 167 to be activated by the output from the threshold detector 145. Thus, when the telephone line is automatically connected to the telephone patch terminal 100, the base station radio transmitter 51 is immediately disabled for a period of five seconds, during which time the calling telephone party is prevented from transmitting and is forced to monitor the radio communication channel.

The terminal L is coupled by a conductor 219 to a set input of a latch 220, the output of which is coupled to the input of a thirty-second delay timer 221 and is also coupled by a conductor 223 to one input of a NAND gate 224. The output of the thirty-second delay timer 221 is coupled by a conductor 222 to a reset input of the latch 220 for resetting the latch 220 thirty seconds after it is set. The other input of the NAND gate 224 is coupled by a conductor 225 to the terminal E, and the output of the NAND gate 224 is coupled to the input of a five-second delay timer 226, the output of which is coupled by a conductor 227 to the set input of the transmitter disable latch 228.

In operation, when the latch 220 is set, it continues to produce an output signal on conductor 223 for thirty seconds until it is reset by the output signal from the thirty-second delay timer 221. Anytime during this thirty-second period that the telephone subscriber is transmitting and the base station transmitter is on, an output signal from the transmitter lamp driver 199 will be produced at terminal E (see FIG. 2), whereby both of the inputs of the NAND gate 224 will be "high", thereby producing a "low" output signal from the NAND gate 224 and turning on the five-second delay timer 226 which, after a five-second interval, will produce an output signal for setting the transmitter disable latch 228 and disabling the base station transmitter 51 for a period of five seconds, as was described above. Thus, during the first thirty seconds of the telephone patch interconnection, the telephone party is prevented from transmitting for more than five seconds at a time, and after each such five-second transmission the transmitter is disabled for five seconds, permitting the radio remote station operator to gain access to the telephone patch interconnection.

The conductor 225 from the terminal E is also coupled to the input of a thirty-second delay timer 321 to one input of an OR gate 232, the output of the thirty-second timer being coupled by the conductor 227 to the set input of the transmitter disable latch 228. The thirty-second delay timer 231 produces an output signal when an input signal from terminal E has been applied to the input thereof for a continuous period of thirty seconds. Thus, during the telephone patch interconnection, the telephone subscriber is prevented from talking or otherwise tieing up the connection for more than thirty seconds at a time, after which period the base station transmitter 51 will be disabled for a five-second period by the transmitter disable latch 228 to permit the radio remote station operator to gain access to the system.

The other input to the OR gate 232 is coupled by a conductor 233 to the terminal J, the output of the OR gate 232 being coupled to one terminal of a capacitor 234, the other terminal of which is grounded, and also to the input of a forty-five second inactivity delay timer 235, the output of which is coupled by a conductor 236 to the reset input of the relay latch 212. The conductor 236 is also coupled to a manual reset switch (not shown) for manually resetting the relay latch 212, and to the terminal Q, the purpose of which latter terminal will be described below.

In operation, a signal will appear on the conductor 233 from the terminal J whenever the receiver lamp driver 197 is energized (see FIG. 2) by the receiver VOX switch 192 when the radio remote station operator is transmitting and the telephone party is not transmitting. Thus, there will be an output signal from the OR gate 232 whenever either the telephone party is transmitting, by reason of an input signal from terminal E, or whenever the radio remote station operator is transmitting, by reason of an input signal from terminal J. The output signal from the OR gate 232 charges the capacitor 234 and this charge maintains the forty-five second inactivity delay timer 235 in an "off" condition. When no input is applied to the OR gate 232, the capacitor 234 will discharge after forty-five seconds through the forty-five second inactivity delay timer 235 to produce an output signal therefrom which resets the relay latch 212, thereby disconnecting the telephone line from the telephone patch terminal 100. Thus, when there is no activity on the communication link for a forty-five second period, the telephone line will automatically be disconnected.

The terminal F is also jumpered to a terminal T to be explained below, and is coupled by a conductor 237 to the input of an audio limiter 238, the output of which is coupled to the input of a dial tone detector, generally designated by the numeral 240. The dial tone detector 240 includes an upper tone filter 241 which is adjustable by a potentiometer 242, and a lower tone filter 244 which is adjustable by a potentiometer 245. The tone filters 241 and 244 are respectively set to pass the two constituent frequencies of the normal telephone dial tone signal. The output from the audio limiter 238 is fed to the inputs of the two tone filters 241 and 244, the outputs of which are coupled to the inputs of a NAND gate 247, having an output coupled to the input of a five-second delay timer 248. The output of the five-second delay timer 248 is coupled by a conductor 249 to the reset inputs of the latch 220 and the transmitter disable latch 228 and also via the conductor 236 to the reset input of the relay latch 212.

In operation, when a dial tone appears on the telephone line, it is passed through the audio limiter 238 and is detected by the dial tone detector 240, which produces high impact signals to the NAND gate 247, which in turn produces a low output signal to the five-second delay timer 248. When the output signal from the NAND gate 247 has appeared at the input of the five-second delay timer 248 for five continuous seconds, the five-second delay timer 248 produces an output signal on the conductor 249 which resets the latches 212, 220 and 228, disconnecting the telephone line from the telephone patch terminal 100. Thus, if the telephone party hangs up, a dial tone will be produced on the telephone line in due course, and after five seconds of dial tone the telephone line will be automatically disconnected from the telephone patch terminal 100.

Referring now also to FIG. 8 of the drawings, the operation of the telephone patch terminal 100 with the automatic line connector 200 will be described in detail. FIGS. 8(a) through (c), respectively, illustrate the time sequences of the line control timing at the base station and events at the calling telephone party station and at the radio remote station. Normally, for this automatic operation the radio base station telephone will have an unlisted number which is known only to the radio licensee and his employees and, therefore, the entire interconnection system will be under the control of the licensee.

A communication begins by a telephone party calling the unlisted telephone number of the radio base station 50, in the same manner as was described above with respect to FIGS. 1 through 5. When the second ringing signal ends at $t_{21}$, it will be detected by the optical isolator 206 and counted by the counter 208, producing an output at terminals L and M for setting the latches 212, 220 and 228, and after about 25 ms the telephone line relay 205 will be energized, connecting the telephone line to the telephone patch terminal 100 at $t_{22}$. At this time the base station transmitter 51 is also immediately disabled by the action of the transmitter disable latch 228, preventing the telephone party for transmitting for five seconds under the control of the five-second delay timer 230. During this period the telephone party monitors the radio communication channel to see if it is being used by others, in order to decide whether or not to stay on the line and allow the transmitter automatically to connect for calling the radio remote station, or whether to hang up because the channel is busy.

At the end of five seconds, at $t_{23}$, the telephone party may begin transmitting, and if the radio channel is clear, he will at this time transmit a voice message indicating which radio remote station he wishes to communicate with and asking that radio remote station to respond. This transmission may last for no more than five seconds to $t_{24}$, after which time the base station transmitter 51 will be disabled by the action of the five-second delay timer 226 and the transmitter disable latch 228, as was described above, the transmitter remaining disabled for five seconds.

At $t_{24}$ the radio remote station operator may transmit a message acknowledging the call, which message lasts until $t_{25}$, at which time the telephone party may again transmit, the keying between transmit and receive modes at the base station 50 being accomplished by the telephone patch terminal 100 in the manner described above with respect to FIGS. 1 through 5. Alternate communications by the telephone party and the radio remote station operator will thus continue, the telephone party being limited to transmissions of no more than five seconds at a time for the first thirty seconds of the interconnection until $t_{26}$, at which time the thirty-second delay timer 221 will reset the latch 220, as was described above. Thus, the telephone party transmision which begins at $t_{27}$, less than five seconds before $t_{26}$, may last for more than five seconds. All subsequent transmissions by the telephone party are limited to thirty seconds in duration by the action of the thirty-second delay timer 231.

The purpose of limiting the telephone party to transmissions of no more than five seconds during the first thirty seconds of the interconnection is to insure that during this critical initial period, the radio remote station operator will be able to have access to the interconnection and advise the telehone party of the nature of two-way radio communication and instruct him as to the one-at-a-time mode of transmission required. While this feature is not critical where the calling telephone party is an employee of the radio licensee, it becomes very significant in the fully automatic system to be described below, where the base station telephone number may be listed and access may be had to the telephone patch terminal 100 by anyone who has access to a telephone. The thirty-second delay timer 231 is for the purpose of insuring that the telehone party cannot tie up the communication link indefinitely. This permits the radio remote station operator periodically to obtain control of the interconnection. Similarly, the forty-five second inactivity delay timer 235 is to protect against the telephone patch interconnection being tied up by occurrences such as a telephone party putting the telephone line on hold and then forgetting about it.

When the conversation has been completed, the telephone party hangs up his telephone at $t_{28}$ and, after about ten seconds, a dial tone will be applied to the telephone line by the telephone company central office equipment at $t_{29}$, in the usual manner, which dial tone will be detected by the dial tone detector 240, and after five seconds the output signal from the five-second delay timer 248 will serve to reset the latches 212, 220 and 228, disconnecting the telephone line from the telephone patch terminal 100 at $t_{30}$. It will be understood that while preferred delay times for the delay timers 221, 226, 230, 231, 235 and 248 have been disclosed, other suitable delay times could be used, if desired.

Figure 10:
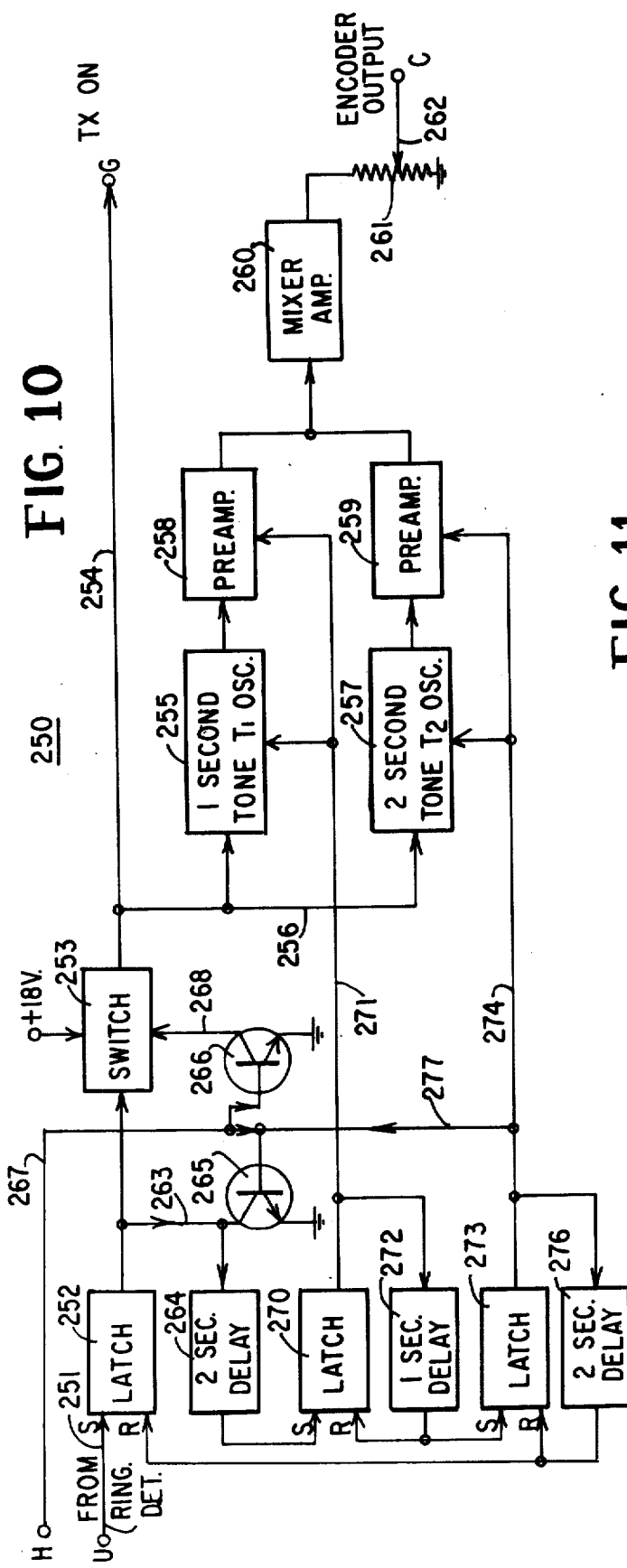
FIG. 10 is a detailed block and schematic diagram of the sequential tone encoder illustrated in FIG. 9
Figure 12:
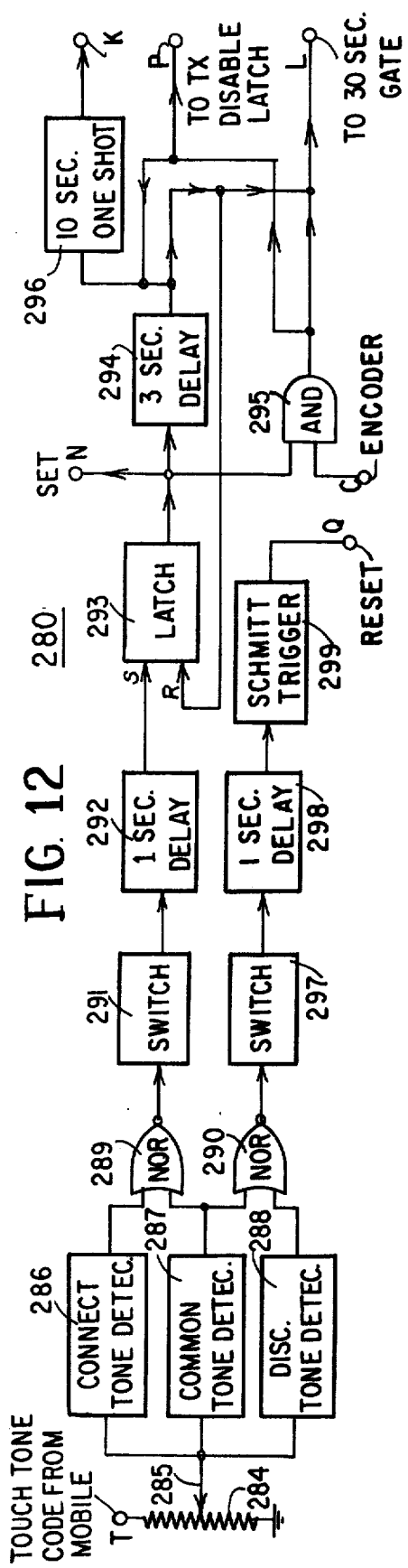
FIG. 12 is a detailed block and schematic diagram of the mobile dial control unit illustrated in FIG. 9.

Referring now also to FIGS. 9, 10 and 12 of the drawings, there is illustrated another embodiment of the present invention wherein the telephone patch terminal 100 at the base station 50 is coupled to the voice coupler 75 through the automatic line connector 200, which is also coupled to a sequential tone encoder, generally designated by the numeral 250, and a remote dial control unit, generally designated by the numeral 280, these latter two devices affording greater control of the interconnection by the radio remote station operator by permitting him to control whether or not the telephone line will be connected to the telephone patch terminal 100. This embodiment also affords greater flexibility, in that the telephone interconnection may be initiated by the radio remote station operator as well as the telephone party.

Referring to FIG. 10, the sequential tone encoder 250 includes a latch 252 having a set input coupled by a conductor 251 to a terminal U which is in turn coupled to the predetermined output terminal of the decimal decoder 210 (see FIG. 7), for receiving the output signal therefrom when the predetermined number of ring signals has been detected, the terminals L and M being disconnected from the decimal decoder 210 but connected to each other by the jumper conductor 210a in this embodiment of the invention. The output of the latch 252 is coupled to one input of a switch 253, the ouput of which is coupled by a conductor 254 to the terminal G and by a conductor 256 to the inputs of tone oscillators 255 and 257, which respectively generate a one-second tone burst of a first frequency $T_1$ and a two-second tone burst of a second frequency $T_2$. The outputs of the tone oscillators 255 and 257 are respectively coupled to inputs of preamplifiers 258 and 259, the outputs of which are both coupled to the input of a mixer amplifier 260. The output of the mixer amplifier 260 is coupled to one end terminal of a potentiometer 261, the other end terminal of which is grounded, the potentiometer 261 having a wiper terminal 262 which is coupled to the terminal C. The switch 253 is provided with an eighteen volt biasing voltage, and when gated on, produces an output signal which energizes the tone oscillators 255 and 257, and enables the base station transmitter 51 by turning on the relay driver 169 via the terminal G and conductor 168 (see FIG. 2).

The output of the latch 252 is also coupled by a conductor 263 to the input of a two second delay timer 264 and to the collector of a transistor 265, the emitter of which is grounded. The base of the transistor 265 is coupled to the base of a transistor 266 having a grounded emitter and a collector coupled by a conductor 268 to a control input of the switch 253. The bases of the transistor 265 and 266 are also coupled by a conductor 267 to the terminal H which is coupled to the output of the receiver VOX 192 in the telephone patch terminal 100 (see FIG. 2). The transistors 265 and 266 are normally turned off, but when the radio remote station is transmitting and the receiver VOX 192 is on, the output signal therefrom will be conducted through the terminal H and the conductor 267 to the bases of the transistors 265 and 266, turning them on for shorting the conductors 263 and 268 to ground and preventing turn-on of the switch 253 and blocking the input to the two-second delay timer 264. The output signal from the latch 252 is, however, held at the inputs of the switch 253 and the two-second timer 264, so that when the receiver VOX 192 goes off, turning off the transistors 265 and 266, the switch 253 is enabled and produces an output signal and the two-second delay timer 264 is activated in response to the held output signal from the latch 252.

The output from the two-second delay timer 264 is coupled to a set input of a latch 270, the output of which is coupled by a conductor 271 to control inputs of the tone oscillator 255 and the preamplifier 258. The output of the latch 270 is also coupled to the input of a one-second delay timer 272, the output of which is coupled to a reset terminal of the latch 270 and to a set terminal of a latch 273. In operation, two seconds after the output signal from the latch 252 has been applied to the input of the two-second delay timer 264, the latter produces an output signal which sets the latch 270, which in turn produces an output signal which turns on the tone oscillator 255 and the preamplifier 258. It should be noted that previously the tone oscillator 255 had been enabled or energized by the output signal from the switch 253, but the tone oscillator 255 does not produce an output signal until it is turned on by the ouput signal from the latch 270. At that time, the tone oscillator 255 produces a one-second burst of tone of frequency $T_1$, which is fed through the preamplifier 258, which has been gated on by the output signal from the latch 270, and thence to the mixer amplifier 260. From the mixer amplifier 260, the tone signal is coupled through the potentiometer 261 and the terminal C to the microphone potentiometer 117 and thence to the audio input terminals of the base station transmitter 51, as was described above with respect to FIGS. 1 through 5. The duration of the tone burst from the tone oscillator 255 is controlled by the one-second delay timer 272 which, one second after the setting of the latch 270, produces an output signal which resets the latch 270 and turns off the tone oscillator 255 and the preamplifier 258.

The output signal from the one-second delay timer 272 also sets the latch 273, which then produces an output signal which is coupled by a conductor 274 to the control inputs of the tone oscillator 257 and the preamplifier 259, which operate in the same manner as the tone oscillator 255 and the preamplifier 258 to produce a tone burst of a second frequency $T_2$ which is then fed to the mixer amplifier 260 and to the base station transmitter 51. The output signal from the latch 273 is also coupled to the input of a two-second delay timer 276, the output of which is coupled to reset inputs of the latches 252 and 273. Thus, two seconds after the latch 273 is set, the two-second delay timer 276 produces an output signal which resets both the latch 252 and the latch 273. The resetting of the latch 273 turns off the tone oscillator 257 and the preamplifier 259, thereby limiting the second tone burst to a two-second duration. It is noted that when the latch 273 is set, the output signal therefrom is also coupled by a conductor 277 to the base of the transistor 265 for turning that transistor on and thereby preventing a refiring of the two-second delay timer 264.

In this embodiment of the invention, the radio remote station 60 is provided with a decoder 275 for detecting the tone signals produced by the sequential tone encoder 250 and lighting a call indicator lamp 278 in response thereto (FIG. 9). The decoder 275 is coupled by a conductor 279 to a control head 281, which is in turn coupled to the transmitter 61 and receiver 62 of the radio remote station 60. The control head 281 preferably includes a standard twelve-button telephone tone dialing unit of the type sold under the trade name "TOUCH-TONE", for generating tone signals to be transmitted by the transmitter 61. Connected to the control head 281 is a busy signal lamp 282 and a telephone handset or headset 283 including a standard microphone and speaker.

Referring now to FIG. 12, the mobile dial control unit 280 includes an input potentiometer 284, one end terminal of which is grounded and the other end terminal of which is coupled to the terminal T, and having a wiper terminal 285 coupled to the inputs of tone detectors 286, 287 and 288. The outputs of the tone detectors 286 and 287 are respectively coupled to the two inputs of a NOR gate 289, while the outputs of the tone detectors 287 and 288 are respectively coupled to the inputs of a NOR gate 290. The output of the NOR gate 289 is coupled to the input of a switch 291, the output of which is coupled to the input of a one-second delay timer 292, the output of which is coupled to a set input of a latch 293. The output of the latch 293 is coupled to the input of a three-second delay timer 294 and to one input of an AND gate 295 and to the terminal N. The output of the three-second delay timer 294 is coupled to the terminal L, to a reset input of the latch 293 and to the input of a ten-second one-shot multivibrator 296, the output of which is coupled to the terminal K. The other input of the AND gate 295 is coupled to the terminal C, the output of the AND gate 295 being coupled to the terminals L and P and to the input of the ten-second one-shot multivibrator 296. The output of the NOR gate 290 is coupled to the input of a switch 297, the output of which is coupled to the input of a one-secnd delay timer 298. The output of the one-second delay timer 298 is coupled to the input of a Schmitt trigger 299, the output of which is coupled to the terminal Q.

In operation, the control head 281 at the radio remote station is utilized to transmit coded tone signals to the base station 50 and the telephone patch terminal 100 and the automatic line connector 200. The first ten control buttons on the control head dial unit corresponding to the buttons numbered 1 through 10 on a telephne tone dialer are utilized for transmitting the standard tone dialing signals for the initiation of a telephone call. The other two buttons of the dialing unit, which are normally not in use in a standard home telephone, are respectively utilized to transmit a line-connect signal and a line-disconnect signal. The tone signal produced by each of the tone buttoms comprises a combination of two frequency tones, the two buttons used for the line-connect and line-disconnect signals having one of their tones in common. At the mobile dial control unit 280, the tone detector 287 is tuned to that common frequency, while the tone detector 286 is tuned to the other frequency of the line-connect tone signal and the tone detector 288 is tuned to the other frequency of the line-disconnect tone signal.

When the line-connect tone signal is transmitted from the radio remote station 60, it is coupled through the base station receiver 52 to the terminal F in the monitor module 135 (FIG. 2) and then to the terminal T in the automatic line connector 200 (FIG. 7) and thence to the input potentiometer 284 of the mobile dial control unit 280 (FIG. 12). The two frequencies of the line-connect signal are then detected by the tone detectors 286 and 287 which produce low output signals which are applied to the inputs of the NOR gate 289, which in turn produces a high output signal which turns on the switch 291. The switch 291 produces an output signal which is fed to the one-second delay timer 292. If the output from the switch 291 is maintained for a period of one second, at the end of that time, the one-second delay timer produces an output signal which sets the latch 293. The latch 293 in turn produces an output signal which is fed to the terminal N for setting the relay latch 212 in the automatic line connector 200 (FIG. 7) and energizing the line relay 205 for connecting the telephone line to the telephone patch terminal 100. The output signal from the latch 293 also activates the three-second delay timer 294 which, after a period of three seconds, produces an output signal which triggers the ten-second one-shot multivibrator 296, which then in turn produces an output signal of ten seconds' duration which is coupled to the terminal K for disabling the transmitter VOX 167 (FIG. 2) and thus disabling the base station transmitter 51. The output signal from the three-second delay timer 294 also resets the latch 293 and is coupled to the terminal L for setting the latch 220 in the automatic line connector 200 (FIG. 7). Thus, when the line-connect tone from the radio remote station is detected by the mobile dial control unit 280, the telephone line will be connected to the telephone patch terminal 100, and the transmitter 51 will remain on for three seconds for the transmission of telephone dial tone to the radio remote station, after which the ten second one-shot multivibrator 296 will be triggered, disabling the base station transmitter 51 for ten seconds, during which time the radio remote station operator may transmit tone dialing signals for calling a telephone subscriber.

It may happen that the radio remote station operator may attempt to place a call at the same time that a telephone party is attempting to call a radio remote station operator. In that event, when the sequential tone encoder 250 is activated in response to the ringing signals from the telephone line as a result of the telephone party dialing the telephone number of the radio base station 50, the output signal from the sequential tone encoder 250 will be applied to the terminal C and thus to the AND gate 295 on the mobile dial control unit 280. That input to the AND gate 295 has a capacitor (not shown) coupled to it which is charged by the output signal from the sequential tone encoder 250. The discharge time of this capacitor is set so that the AND gate 295 will be held in a ready condition for a predetermined period of time, approximately thirty to forty-five seconds, during which time if the latch 293 produces an output signal as a result of the radio remote station operator attempting to place a call, the AND gate 295 will immediately produce an output signal which is coupled to the terminal P for setting the transmitter disable latch 228 in the automatic line connector 200 (FIG. 7), which in turn disables the base station transmitter 51 for a five-second period. The AND gate 295 output is also coupled immediately to the terminal L, for setting the latch 220 and activating the thirty-second delay timer 221 (FIG. 7). Thus, the radio remote station operator may immediately obtain control of the interconnection and transmit to the telephone subscriber.

When the radio remote station operator has completed a call and wishes to hang up the base station telephone, he transmits the line-disconnect signal which is detected by the tone detectors 287 and 288, which in turn produce low output signals which are applied to the NOR gate 290. The NOR gate 290 produces a high output signal which turns on the switch 297, which in turn activates the one-second delay timer 298. If the switch output 297 continues for one second, the one-second delay timer 298 will produce an output signal which turns on the Schmitt trigger 299, which produces an output signal which is coupled to the terminal Q for resetting the relay latch 212 in the automatic line connector 200 (FIG. 7) and thereby disconnecting the telephone line from the telephone patch terminal 100.

It is noted that the purpose of the one-second delay timers 292 and 298 is to prevent the mobile dial control unit 280 from being responsive to spurious signals in the radio communication channel or on the telephone line which might happen to be the same frequency as the line-connect and line-disconnect tones.

Figure 11:
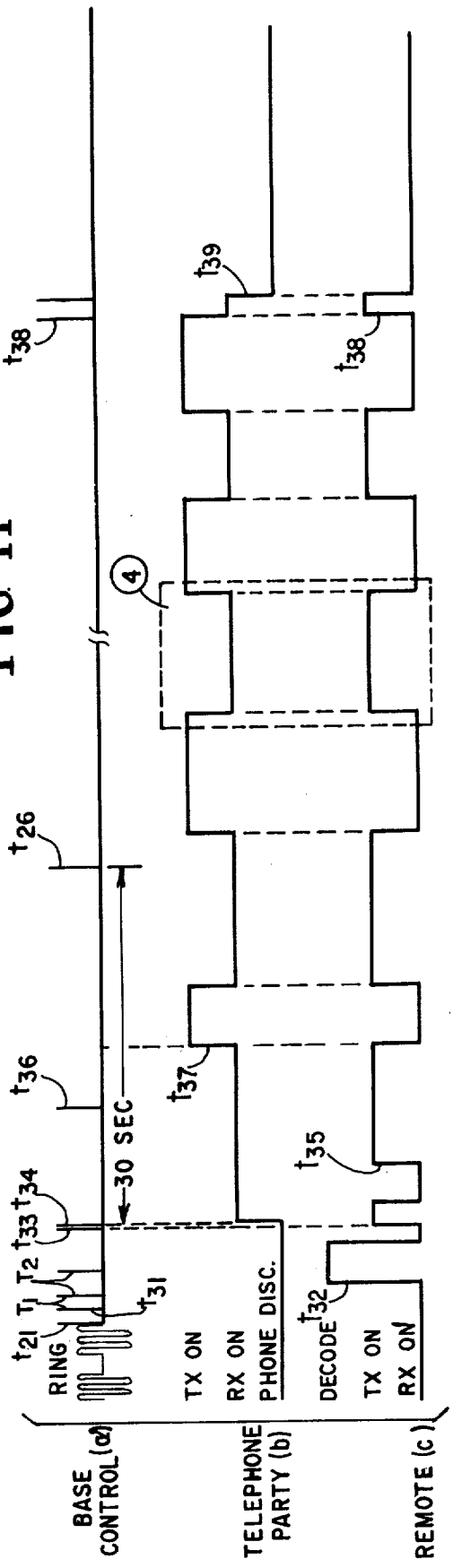
FIGS. 11(a) through (c) are timing sequence graphs illustrating the relative times at which operations are performed in accordance with the present invention including the sequential tone encoder.

Referring now to FIG. 11 of the drawings, the operation of the system when a call is placed by a telephone subscriber will be described in detail. FIGS. 11(a), (b) and (c) respectively illustrate the timing sequence of events at the base station, at the calling telephone party and at the radio remote station. When the telephone subscriber wishes to place a call, he dials the telephone number of the base station telephone and the telephone ringing signals are detected and counted by the counter 208 (FIG. 7) at $t_{21}$. It is noted that when the system is arranged in the fully automatic configuration, utilizing the sequential tone encoder 250 and the remote dial control unit 280, the terminals L and M of the automatic line connector 200 are disconnected from the decimal decoder 210, and the terminal U is connected. The output of the decimal decoder 210 is coupled through the terminal U to the set input of the latch 252 (FIG. 10) which procudes an output signal to actuate the switch 253 and the two-second delay timer 264 if the radio channel is not busy. If the radio channel is busy, and radio signals are being received at the receiver 51 of the base station, there will be an output signal on the terminal H which will disable the switch 253 and the two-second delay timer 264 through the operation of the transistors 265 and 266, as was described above.

As soon as the traffic on the radio channel ceases and the receiver audio path of the telephone patch terminal 100 is opened, the switch 253 will produce an output signal which enables the base station transmitter via the terminal G, and energizes the tone ocillators 255 and 257. The two-second delay timer 264 will after two seconds, at $t_{31}$ set the latch 270 which produces an output signal to gate on the tone oscillator 255 and the preamplifier 58 for producing a one-second tone burst of frequency $T_1$. The output signal from the latch 270 also activates the one-second delay timer 272 which, after one second, resets the latch 270, turning off the tone oscillator 255 and sets the latch 273 turning on the tone oscillator 257 for generating a two-second tone burst of frequency $T_2$. The output of the latch 273 also activates the two-second delay timer 276 which, after two seconds, resets the latch 273 and 252, turning off the tone oscillator 257. The tone signals are transmitted to the radio remote station and there decoded at $t_{32}$ by the decoder 275, which produces an output indication by lighting the call lamp 278 (FIG. 9). Other indications such as buzzers and the like could also be used.

The remote station operator is now aware that he is being called, and he then activates his control head 281 to transmit a line-connect tone signal at $t_{33}$ which is received at the base station 50 and coupled via the terminals F and T (FIGS. 2 and 7) to the mobile dial control unit 280 (FIG. 12), where the signal is detected by the tone detectors 286 and 287. The outputs from these tone detectors in turn cause an output signal from the NOR gage 289 which acts through the switch 291, the one-second delay timer 292 and the latch 293 to produce an output signal which is coupled through the terminal N to set the relay latch 212 (FIG. 7) for connecting the telephone line to the telephone patch terminal 100 at $t_{34}$, the connection time being about 25 ms. However, the output signal from the sequential tone encoder 250 at terminal C has enabled the AND gate 295, which is responsive to the output signal from the latch 293 for producing an output signal which is applied to the terminal P for disabling the base station transmitter 51 through the action of the transmitter disable latch 228. The output of the AND gate 295 also triggers the ten-second one-shot multivibrator 296, which produces an output signal on the terminal K to hold the base station transmiter 51 disabled for ten seconds. Thus, for a period of ten seconds, the telephone party may not transmit.

However, the radio remote station operation at $t_{35}$, transmits a message to the telephone party advising him of the nature of the simplex radio communication procedure and acknowledging the call. At $t_{36}$, the ten-second time period expires, and the base station transmitter is again enabled, so that the telephone party can transmit as soon as the radio remote station operator has completed his transmission at $t_{37}$.

However, the output of the AND gate 295 has also set the latch 220 energizing the thirty-second delay timer 221, so that until it times out at $t_{26}$, the telephone party is limited to transmissions of five seconds' duration by the action of the five-second delay timer 226 (FIG. 7), as was described above. The conversation then continues in the normal manner as was previously described, until at $t_{38}$ the conversation is completed and the radio remote station operator wishes to terminate the call and disconnect the telephone line at the base station. At this time he operates his control head 281 to transmit a line-disconnect signal which is detected by the tone detectors 287 and 288 and, operating through the NOR gate 290, the switch 297, the one-second delay timer 298 and the Schmitt trigger 299, produces an output signal on the terminal Q for resetting the relay latch 212 and disconnecting the telephone line from the telephone patch terminal 100 at $t_{39}$. The time period of approximately two seconds from $t_{38}$ to $t_{39}$ is caused by the one-second delay timer 298 and by the transmission and switching times and the time required for the line relay 205 to operate.

It will also be understood that the telephone conversation could also have been terminated by the telephone party hanging up his telephone, in which case the ensuing dial tone on the telephone line will be detected by the dial tone detector 240 (FIG. 7) and will ultimately disconnect the telephone line from the telephone patch terminal 100 in a manner described above.

Figure 13:
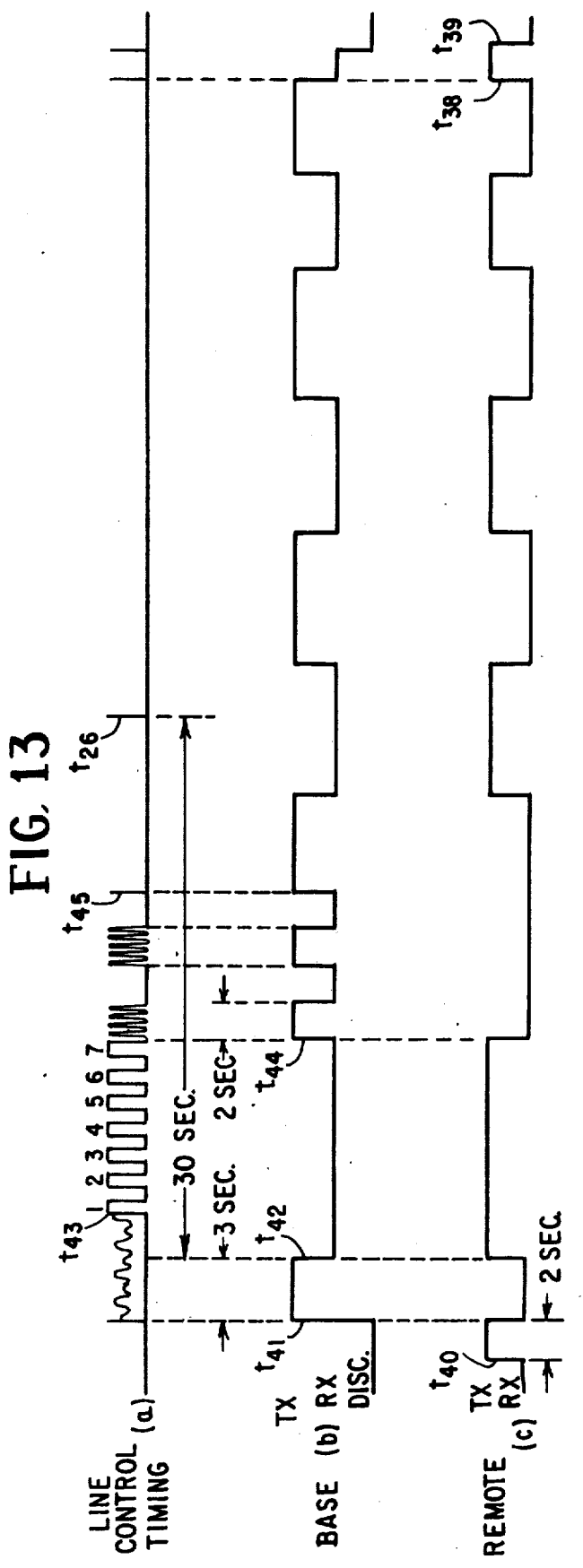
FIGS. 13(a), (b) and (c) are timing sequence graphs illustrating the relative times at which operations are performed in accordance with the present invention including the mobile dial control unit.

Referring now to FIG. 13 of the drawings, the operation of the system when the telephone call is initiated by the radio remote station operator will be described in detail. FIGS. 13(a), (b) and (c) respectively illustrate the timing sequence of events for the line control signals, the events at the base station telephone and the events at the radio remote station. When the radio remote station operator wishes to initiate a telephone call, he activates his control head 281 to transmit a line-connect signal at $t_{40}$ to the base station, which signal is detected by the tone detectors 286 and 287, whereupon the mobile dial control unit 280 operates to set the relay latch 212 and connect the telephone line to the telephone patch terminal 100 at $t_{41}$, as described above. The output signal from the latch 293 also activates the three-second delay timer 294 which, after three seconds at $t_{42}$, produces an output signal for triggering the ten-second one-shot multivibrator 296 to disable the base station transmitter 51 for a ten-second period, and also setting the latch 220 in the automatic line connector 200 for activating the thirty-second delay timer 221.

During the three-second period after the delay timer 294 is activated, dial tone on the telephone line is transmitted to the radio remote station operator, and after three seconds he will stop hearing the dial tone by reason of the base station transmitter having been disabled by the ten-second one-shot multivibrator 296, and he will then have a ten-second period in which to transmit tone telephone dialing signals to cal the desired telephone party, which tone dial signals are transmitted from $t_{43}$ to $t_{44}$. In response to these dialing signals, ringing signals are generated on the telephone line at $t_{44}$ and the telephone party answers his telephone at $t_{45}$ and acknowledges the call. However, because the latch 220 and thirty-second delay timer 221 are activated, until the thirty-second time period has expired at $t_{26}$, the telephone party is limited to transmissions of no greater than a five-second duration. After that, the conversation continues in the usual manner and at the end of the conversation the telephone line may be disconnected at the telephone patch terminal 100 by the radio remote station operator transmitting a line-disconnect signal at $t_{38}$ for disconnecting the telephone line at $t_{39}$, as was described above, or the telephone line can be disconnected by the telephone party hanging up as described above.

It is noted that the purpose of the ten-second one-shot multivibrator 296 disabling the base station transmitter during dialing by the radio remote station operator is because it has been found that the telephone line is unbalanced during dialing, so that the dialing tone signals are fed back and may trigger the transmitter keying module 140 and thereby disable the audio receiver path through the telephone patch terminal 100 and cause loss of dialing digits.

Furthermore, it is noted that the thirty-second time period provided by the latch 220 and the thirty-second delay timer 221 in the automatic line connector 200 permits the radio remote station operator to regain control of the interconnection if he dials a call and gets a busy signal. More particularly, after the dialing is completed, the base station transmitter is reenabled because the ten-second one-shot multivibrator 296 has timed out and, therefore, busy signals on the telephone line will be transmitted to the radio remote station and, accordingly, during this transmission the base station receiver 52 is turned off. The repetition rate of the telephone busy signals is such that the time period between the signals is less than the sustain time set by the potentiometer 165 for the threshold detector 145. Thus, as long as the busy signals continue, the base station transmitter 51 remains on and the base station receiver 52 remains off and the radio remote station operator cannot get access to the interconnection, even to disconnect the telephone line. The thirty-second delay timer 221 insures that after thirty seconds of busy signals, the telephone line will be disabled for a five-second period in order to permit the radio remote station operator to transmit a line-disconnect signal to disconnect the telephone line.

While the present invention has been described for use with a simplex radio communication system, it will be understood that the invention, including the telephone patch terminal 100, the automatic line connector 200, the sequential tone encoder 250 and the remote dial control unit 280, could also be utilized with any other type of two way radio systems, including duplex, half-duplex and the like. In particular, the telephone line priority mode of operation would be advantageous in any of those radio systems.

From the foregoing, it can be seen that there has been provided a novel system for interconnecting a telephone line to a simplex radio communication system, which interconnection may be operated either manually or automatically, and which, in the automatic mode, provides for control of the interconnection by the radio system licensee.

More particularly, there has been provided interconnection apparatus of the type set forth, which provides very fast switching between the transmit and receive conditions by activating the switching means directly with A.C. signals provided by non-linear amplification of the A.C. audio signals from the telephone line and the radio system, without limiting or bias filtering thereof, thereby providing a more natural type of conversation for the telephone party.

There has also been provided an improved interconnection apparatus of the type set forth, which is selectively operable in either an anti-VOX mode wherein the base station radio transmitter is disabled when the base station radio receiver is operating and vice-versa, and a telephone line priority mode wherein the base station transmitter will be enabled and the base station receiver disabled whenever the telephone party is talking.

There has also been provided an apparatus for automatically interconnecting the telephone line with the simplex radio system in response to telephone ringing signals at the radio base station when a telephone party calls the base station telephone, but constrains the telephone party to transmissions of a limited short duration for a predetermined time period to insure access to the interconnection by the radio remote station operator during that time period.

There has also been provided an automatic apparatus of the type set forth, which provides for completion of the telephone line interconnection at the radio base station under the control of the radio remote station operator when the call is originated by the telephone party, and additionally permits the remote station operator to initiate the call himself.

There has also been provided an automatic interconnection apparatus of the type set forth, which insures that the interconnection cannot be tied up by the telephone party, so that it is under the control of the radio station licensee.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Apparatus for interconnecting a wire telephone line with a simplex radio system including a radio receiver having an audio output and a radio transmitter having an audio input, said apparatus comprising receiver switch means operable between a normal open condition disconnecting the receiver audio output from the telephone line and a closed condition connecting the receiver audio output to the telephone line, receiver control means coupled to said receiver switch means for controlling the operation thereof between the open and closed conditions thereof, receiver amplifying means coupled to said receiver control means and to the receiver audio output for generating a first control signal from the unrectified A.C. audio signals from the receiver and applying such control signal directly to said receiver control means with a time delay of not greater than about five milliseconds, said receiver control means being responsive to the first control signal for closing said receiver switch means for the duration of the first control signal to couple the A.C. audio signals to the telephone line, transmitter switch means operable between a normal open condition disconnecting the telephone line from the transmitter audio input and a closed condition connecting the telephone line to the transmitter audio input, transmitter control means coupled to said transmitter switch means for controlling the operation thereof between the open and closed conditions thereof, and transmitter amplifying means coupled to said transmitter control means and to the telephone line for generating a second control signal from the unrectified A.C. audio signals from the telephone line and applying such control signal directly to said transmitter control means with a time delay of not greater than about five milliseconds, said transmitter control means being responsive to the second control signal for closing said tramsmitter switch means for the duration of the second control signal to couple the telephone line A.C. audio signals to the transmitter.

2. The apparatus set forth in claim 1, and further including receiver compression means coupled between the receiver audio output and said receiver switch means for compressing the voice signals from the receiver, and transmitter compression means coupled between the telephone line and said transmitter switch means for compressing the voice signals from the telephone line.

3. The apparatus set forth in claim 1, and further including receiver compression means coupled between the receiver audio output and said receiver switch means for compressing the voice signals from the receiver, and two transmitter compression circuits connected in series between the telephone line and said transmitter switch means for compressing the voice signals from the telephone line and increasing the signal-to-noise ratio thereof.

4. The apparatus set forth in claim 1, and further including monitor means coupled to the radio receiver and to the telephone line for monitoring audio signals from both.

5. The apparatus set forth in claim 1, wherein each of said receiver amplifying means and said transmitter amplifying means includes a band pass filter means for passing only those frequency components of the AC audio signals from the receiver and from the telephone line in the range of from about 600Hz to about 1,000 Hz.

6. The apparatus set forth in claim 1, wherein each of said receiver amplifying means and said transmitter amplifying means includes non-linear amplifying means producing disproportionate amplification of alternate half cycles of the AC audio input signals from the receiver and from the telephone line for providing said control signals.

7. Apparatus for interconnecting a wire telephone line with a simplex radio system including a radio receiver having an audio output and a radio transmitter having an audio input, said apparatus comprising receiver switch means operable between a normal open condition disconnecting the receiver audio output from the telephone line and a closed condition connecting the receiver audio output to the telephone line, a first capacitor coupled to said receiver switch means and effective when charged to a predetermined voltage for holding said receiver switch means open and effective when discharged to close said receiver switch means, first capacitor control means including a first switch element coupled to said first capacitor and operable between a first condition for preventing discharge of said first capacitor and a second condition providing a path for substantially instantaneous discharge of said first capacitor, first non-linear amplifier means coupled to said first capacitor control means and to the receiver audio output for generating a first control signal from the unrectified A.C. audio signals from the receiver and applying such control signal directly to said first capacitor control means with a time delay of not greater than about 5 milliseconds, said first capacitor control means being responsive to said first control signal for operating said first switch element from the first condition to the second condition thereof to discharge said first capacitor, first capacitor charging means coupled to said first capacitor for effecting charging thereof from a discharged condition to said predetermined charge in a predetermined time period to hold said receiver switch means in its closed condition during said predetermined time period, transmitter switch means operable between a normal open condition disconnecting the telephone line from the transmitter audio input and a closed condition connecting the telephone line to the transmitter audio input, a second capacitor coupled to said transmitter switch means and effective when charged to a predetermined voltage for holding said transmitter switch means open and effective when discharged to close said transmitter switch means, second capacitor control means including a second switch element coupled to said second capacitor and operable between a first condition for preventing discharge of said second capacitor and a second condition providing a path for substantially instantaneous discharge of said second capacitor, second non-linear amplifier means coupled to said second capacitor control means and to the telephone line for generating a second control signal from the unrectified A.C. audio signals from the telephone line and applying such control signal directly to said second capacitor control means with a time delay of not greater than about 5 milliseconds, said second capacitor control means being responsive to said second control signal for operating said second switch element from the first condition to the second condition thereof, and second capacitor charging means coupled to said second capacitor for effecting charging thereof from a discharged condition to said second predetermined charge in a predetermined time period to hold said transmitter switch means in its closed condition during said predetermined time period.

8. The appartus set forth in claim 7, wherein each of said first and second switch elements is a transistor.

9. The apparatus set forth in claim 7, wherein each of said first and second non-linear amplifier means produces disproportionate amplification of alternate half cycles of the A.C. audio signals from the receiver and from the telephone line for producing the first and second control signals.

10. Apparatus for interconnecting a wire telephone line with a simplex radio system including a radio receiver having an audio output and a radio transmitter having an audio input, said apparatus comprising receiver switch means operable between a normal open condition disconnecting the receiver audio output from the telephone line and a closed condition connecting the receiver audio output to the telephone line, transmitter switch means operable between a normal open condition disconnecting the transmitter audio input from the telephone line and a closed condition connecting the transmitter audio input to the telephone line, and switch control means coupled to said receiver switch means and to said tramsmitter switch means for controlling the operation thereof between the open and closed conditions thereof, said switch control means being responsive to audio signals from the receiver in the absence of audio signals from the telephone line for closing said receiver switch means for the duration of such receiver signals to couple the receiver signals to the telephone line, said switch control means being responsive to audio signals from the telephone line and regardless of the simultaneous presence of audio signals from the receiver for closing said transmitter switch means and locking said receiver switch means open for the duration of such telephone line signals and coupling the telephone line signals to the transmitter.

11. Apparatus for interconnecting a wire telephone line with a simplex radio system including a radio receiver having an audio output and a radio transmitter having an audio input, said apparatus comprising balanced coupling circuit means having telephone terminals for coupling to the telephone line and having input terminals and output terminals, said balanced coupling cricuit means establishing a substantially one-way receiver audio path from said input terminals to the telephone line and a substantially one-way transmitter audio path from the telephone line to said output terminals, receiver switch means operable between a normal open conditions disconnecting the receiver audio output from said balanced coupling circuit input terminals and a closed condition connecting the receiver audio output to said balanced coupling circuit input terminals, receiver control means coupled to said receiver switch means for controlling the operation thereof between the open and closed conditions thereof, said receiver control means being responsive to audio signals from the receiver for closing said receiver switch means for the duration of such signals to couple the signals to the telephone line, transmitter switch means operable between a normal open condition disconnecting the transmitter audio input from said balanced coupling circuit output terminals and a closed condition connecting the transmitter audio input to said balanced coupling circuit output terminals, transmitter control means coupled to said transmitter switch means for controlling the operation thereof between the open and closed conditions thereof, said transmitter control means being responsive to audio signals from the telephone line for closing said tramsmitter switch means for the duration of such telephone line signals and coupling the telephone line signals to the transmitter, receiver lockout means coupling said transmitter switch means to said receiver switch means for locking said receiver switch means open when said transmitter switch means is closed, and variable threshold means coupled between said receiver switch means and said transmitter control means and operative when said receiver switch means is open for rendering said transmitter control means responsive only to telephone line signals of a first predetermined amplitude and operative when said receiver switch means is closed for rendering said transmitter control means responsive only to telephone line signals having a second predetermined amplitude greater than said first predetermined amplitude and greater than that of any feedback receiver audio signals which might be coupled from said receiver audio path through said balanced coupling circuit to said transmitter audio path, whereby said transmitter switch means is closed in response to audio signals from the telephone line but is not closed in response to feedback audio signals from the receiver.

12. The apparatus set forth in claim 11, wherein said balanced coupling circuit means comprises a hybrid transformer including a balancing circuit to minimize the level of feedback signals between the receiver audio path and the transmitter audio path.

13. The apparatus set forth in claim 11, wherein said balanced coupling circuit means includes balancing means for minimizing the amplitude of feedback audio signals between said receiver audio path and said transmitter audio path with the lowest feedback signal level occurring at a predetermined null frequency, and further including bandpass filter means coupled between said balanced coupling circuit means output terminals and said transmitter switch means and having a passband centered at said null frequency and extending approximately 300 Hz. on either side thereof, thereby to further minimize the possibility of said transmitter switch means responding to audio signals fed back from said receiver audio path through said balanced coupling circuit means to said transmitter audio path.

14. The apparatus set forth in claim 11, wherein said receiver control means includes delay means for delaying the closing of said receiver switch means after receipt by said receiver control means of audio signals from said receiver for a predetermined short time sufficient to permit said variable threshold means to be enabled.

15. The apparatus set forth in claim 11, and further including mode selector switch means coupled to said receiver switch means and selectively shiftable between a first condition coupling said receiver switch means to said variable threshold means and a second condition coupling said receiver switch means to said transmitter switch means, said transmitter switch means being responsive to said receiver switch means when said mode selector switch means is in the second condition thereof for locking said transmitter switch means open when said receiver switch means is closed.

16. Apparatus for interconnecting a wire telephone line with a simplex radio system including a radio receiver having an audio output and a radio transmitter having an audio input, said apparatus comprising balanced coupling circuit means having telephone terminals for coupling to the telephone line and having input terminals and output terminals, said balanced coupling circuit means establishing a substantially one-way receiver audio path from said input terminals to the telephone line and a substantially one-way transmitter audio path from the telephone line to said output terminals, receiver switch means operable between a normal open condition disconnecting the receiver audio output from said balanced coupling circuit input terminals and a closed condition connecting the receiver audio output to said balanced coupling circuit input terminals, receiver control means coupled to said receiver switch means for controlling the operation thereof between the open end closed conditions thereof, receiver amplifying means coupled to said receiver control means and to the receiver audio output for generating a first control signal from the unrectified A.C. audio signals from the receiver and applying such control signal directly to said receiver control means with a time delay of not greater than about five milliseconds, said receiver control means being responsive to the first control signal for closing said receiver switch means for the duration of the first control signal to couple the A.C. audio signals to the telephone line, transmitter switch means operable between a normal open condition disconnecting the transmitter audio input from said balanced coupling circuit output terminals and a closed condition connecting the transmitter audio input to said balanced coupling circuit output terminals, transmitter control means coupled to said transmitter switch means for controlling the operation thereof between the open and closed conditions thereof, transmitter amplifying means coupled to said transmitter control means and to said balanced coupling circuit output terminals for generating a second control signal from the unrectified A.C. audio signals from the telephone line and applying such control signal directly to said transmitter control means with a time delay of not greater than about five milliseconds, said transmitter control means being responsive to the second control signal for closing said transmitter switch means for the duration of the second control signal to couple the telephone line A.C. audio signals to the transmitter, receiver lockout means coupling said transmitter switch means to said receiver switch means for locking said receiver switch means open when said transmitter switch means is closed, and variable threshold means coupled between said receiver switch means and said transmitter control means and operative when said receiver switch means is open for rendering said transmitter control means responsive only to a second control signal of a first predetermined amplitude and operative when said receiver switch means is closed for rendering said transmitter control means responsive only to a second control signal having a second predetermined amplitude greater than said first predetermined amplitude and greater than that of a second control signal generated in response to any feedback receiver audio signals which might be coupled from said receiver audio path through said balanced coupling circuit to said transmitter audio path, whereby said transmitter switch means is closed in response to audio signals from the telephone line but is not closed in response to feedback audio signals from the receiver.

17. Apparatus for automatically interconnecting a wire telephone line with a simplex radio system including a radio receiver having an audio output and a radio transmitter having an audio input, said apparatus comprising an interconnection circuit having receiver terminals coupled to the audio output of the radio receiver and transmitter terminals coupled to the audio input of the radio transmitter and telephone terminals, said interconnection circuit establishing a substantially one-way receiver audio path from said receiver terminals to said telephone terminals and a substantially one-way transmitter audio path from said telephone terminals to said transmitter terminals, receiver lockout means responsive to the presence of audio signals from the telephone line in said transmitter audio path for interrupting said receiver audio path, switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals thereon for producing a control signal, switch control means coupled to said switch means and to said telephone ring detector and responsive to said control signal for closing said switch means, and timing control means coupled to said ring detector and to said switch means and to said interconnection circuit, said timing control means being enabled by the detection of telephone ring signals by said ring detector and being responsive thereafter to the continuous presence of audio signals from the telephone line in said transmitter audio path for a predetermined time period for interrupting said transmitter audio path, thereby preventing interruption of said receiver audio path and consequent lockout of the radio receiver for longer than said predetermined time period.

18. The apparatus set forth in claim 17, wherein said timing control means is operative to interrupt said transmitter audio path for a second predetermined time.

19. The apparatus set forth in claim 17, wherein said timing control means includes disable means operative a second predetermined time after said timing control means is enabled for automatically disabling same.

20. The apparatus set forth in claim 17, wherein said switch control means includes timing means operative a predetermined time after said switch means is closed for opening same.

21. The apparatus set forth in claim 17, and further including second timing control means coupled to said switch means and to said interconnection circuit and responsive to the continuous presence of audio signals from the telephone line in said transmitter audio path for a second predetermined time period greater than said predetermined time period for opening said switch means.

22. The apparatus set forth in claim 17, and further including inactivity timing means coupled to said switch means and to said interconnection circuit and responsive to the absence of audio signals in either said transmitter audio path of said receiver audio path for a second predetermined time period for opening said switch means.

23. The apparatus set forth in claim 17, and further including a dial tone detector coupled to said switch means and to the telephone line and responsive to telephone dial tone from the telephone line of a predetermined duration for opening said switch means.

24. Apparatus for automatically interconnecting a wire telephone line with a simplex radio system including a radio receiver having an audio output and a radio transmitter having an audio input, said apparatus comprising balanced coupling circuit means having telephone terminals for coupling to the telephone line and having input terminals and output terminals, said balanced coupling circuit means establishing a substantially one-way receiver audio path from said input terminals to the telephone line and a substantially one-way transmitter audio path from the telephone line to said output terminals, receiver switch means operable between a normal open condition disconnecting the receiver audio output from said balanced coupling circuit input terminals and a closed condition connecting the receiver audio output to said hybrid circuit input terminals, receiver control means coupled to said receiver switch means for controlling the operation thereof between the open and closed conditions thereof, receiver amplifying means coupled to said receiver control means and to the receiver audio output for generating a first control signal from the unrectified A.C. audio signals from the receiver and applying such control signal directly to said receiver control means with a time delay of not greater than about five milliseconds, said receiver control means being responsive to the first control signal for closing said receiver switch means for the duration of the first control signal to couple the A.C. audio signals to the telephone line, transmitter switch means operable between a normal open condition disconnecting the transmitter audio input from said balanced coupling circuit output terminals and a closed condition connecting the transmitter audio input to said balanced coupling circuit output terminals, transmitter control means coupled to said transmitter switch means for controlling the operation thereof between the open and closed conditions thereof, transmitter amplifying means coupled to said transmitter control means and to said balanced coupling circuit output terminals for generating a second control signal from the unrectified A.C. audio signals from the telephone line and applying such second control signal directly to said transmitter electronic control means with a time delay of not greater than about five milliseconds, said transmitter control means being responsive to the second control signal for closing said transmitter switch means for the duration of the second control signal to couple the telephone line A.C. audio signals to the transmitter, receiver lockout means coupling said transmitter switch means to said receiver switch means for locking said receiver switch means openw when said transmitter switch means is closed, variable threshold means coupled between said receiver switch means and said transmitter control means and operative when said receiver switch means is open for rendering said transmitter control means responsive only to a second control signal of a first predetermined amplitude and operative when said receiver switch means is closed for rendering said transmitter control means responsive only to a second control signal having a second predetermined amplitude greater than said first predetermined amplitude and greater than that of a second control signal generated in response to any feedback receiver audio signals which might be coupled from said receiver audio path through said balanced coupling circuit to said transmitter audio path, telephone switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals thereon for producing a third control signal, telephone switch control means coupled to said telephone switch means and to said telephone ring detector and responsive to said third control signal for closing said telephone switch means, and timing control means coupled to said ring detector and to said telephone switch means and to said transmitter switch means, said timing control means being enabled by the detection of telephone ring signals by said ring detector and being responsive thereafter to the continuous closing of said transmitter switch means for a predetermined time period for opening said transmitter switch means, whereby said transmitter switch means is closed in response to audio signals from the telephone line but is not closed in response to feedback audio signals from the receiver and interruption of said receiver audio path and consequent lockout of the radio receiver for longer than said predetermined time period is prevented.

25. Apparatus for automatically interconnecting a wire telephone line with a simplex radio system including a base station radio receiver having an audio output and a base station radio transmitter having an audio input and at least one remote station radio transceiver, said apparatus comprising an interconnection circuit having receiver terminals coupled to the radio receiver audio output and transmitter terminals coupled to the radio transmitter audio input and telephone terminals, said interconnection circuit establishing a substantially one-way receiver audio path from said receiver terminals to said telephone terminals and a substantially one-way transmitter audio path from said telephone terminals to said transmitter terminals, receiver lockout means responsive to the presence of audio signals from the telephone line in said transmitter audio path for interrupting said receiver audio path, switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals therefrom for generating a first control signal, a normally inoperative base station encoder having an output coupled to said transmitter audio input, encoder control means coupled to said ring detector and to said base station encoder and responsive to said first control signal for rendering said base station encoder operative to generate a coded calling signal at its output for transmission by the base station transmitter to the remote station transceiver, a remote station decoder coupled to the remote station transceiver and responsive to said coded calling signal received from the base station transmitter for producing an output indication, a remote station encoder coupled to the remote station transceiver and operative to generate a coded line-connect signal for transmission by the remote station transceiver to the base station receiver, and a base station decoder coupled to the base station receiver audio output and to said switch means and being responsive to said coded line-connect signal received from said remote station transceiver for generating a second control signal to close said switch means.

26. The apparatus set forth in claim 25, wherein said coded calling signal includes a one-second tone burst of a first predetermined frequency followed by a two-second tone burst of a second predetermined frequency.

27. The apparatus set forth in claim 25, wherein said encoder control means includes disabling means coupled to said interconnection circuit and responsive to the presence of audio signals in said receiver audio path for disabling said encoder control means for the duration of such signals.

28. The apparatus set forth in claim 25, and further including timing means coupled to said base station decoder and to said interconnection circuit and responsive a first predetermined time after said second control signal for interrupting said transmitter audio path for a second predetermined time.

29. The apparatus set forth in claim 25, wherein said remote station encoder is operative for generating a coded line-disconnect signal for transmission by the remote station transceiver to the base station receiver, said base station decoder being responsive to said coded line-disconnect signal received from said remote station transceiver for generating a third control signal to open said switch means.

30. Apparatus for automatically interconnecting a wire telephone line with a simplex radio system including a base station radio receiver having an audio output and a base station radio transmitter having an audio input and at least one remote station radio transceiver, said apparatus comprising an interconnection circuit having receiver terminals coupled to the radio receiver audio output and transmitter terminals coupled to the radio transmitter audio input and telephone terminals, said interconnection circuit establishing a substantially one-way receiver audio path from said receiver terminals to said telephone terminals and a substantialy one-way transmitter audio path from said telephone terminals to said transmitter terminals, receiver lockout means responsive to the presence of audio signals from the telephone line in said transmitter audio path for interrupting said receiver audio path, switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals therefrom for generating a first control signal, a normally inoperative base station encoder having an output coupled to said transmitter audio input, encoder control means coupled to said ring detector and to said base station encoder and responsive to said first control signal for rendering said base station encoder operative to generate a coded calling signal at its output for transmission by the base station transmitter to the remote station transceiver, a remote station decoder coupled to the remote station transceiver and responsive to said coded calling signal received from the base station transmitter for producing an output indication, a remote station encoder coupled to the remote station transceiver and operative to generate a coded line-connect signal for transmission by the remote station transceiver to the base station receiver, a base station decoder coupled to the base station receiver audio output and to said switch means and being responsive to said coded line-connect signal received from the remote station transceiver for generating a second control signal to close said switch means, and timing means coupled to said base station encoder and to said base station decoder and to said interconnection circuit, said timing means being enabled by said calling signal from said base station encoder and being responsive thereafter to said second control signal from said base station decoder for interrupting said transmitter audio path for a predetermined time period.

31. The apparatus set forth in claim 30, and further including second timing means coupled to said ring detector and to said switch means and to said interconnection circuit, said second timing means being enabled by the detection of telephone ring signals by said ring detector and being responsive thereafter to the continuous presence of audio signals from the telephone line in said transmitter audio path for a second predetermined time period for interrupting said transmitter audio path, said second timing means including disabling means responsive a third predetermined time after said second timing control means is enbled for disabling same.

32. Apparatus for automatically interconnecting a wire telephone line with a simplex radio system including a base station radio receiver having an audio output and a base station radio transmiter having an audio input and at least one remote station radio transceiver, said apparatus comprising an interconnection circuit having receiver terminals coupled to the radio receiver audio output and transmitter terminals coupled to the radio transmitter audio input and telephone terminals, said interconnection circuit establishing a substantially one-way receiver audio path from said receiver terminals to said telephone terminals and a substantially one-way transmitter audio path from said telephone terminals to said transmitter terminals, receiver lock-out means responsive to the presence of audio signals from the telephone line in said transmitter audio path for interrupting said receiver audio path, switch means coupled to said telephone terminals and to the telephone line and operable between a normal open condition for disconnecting the telephone line from said telephone terminals and a closed condition for connecting the telephone line to said telephone terminals, a telehone ring detector coupled to the telephone line and responsive to telephone ring signals therefrom for generating a first control signal, a normally inoperative base station encoder having an output coupled to said transmitter audio input, encoder control means coupled to said ring detector and to said base station encoder and responsive to said first control signal for rendering said base station encoder operative to generate a coded calling signal at its output for transmission by the base station transmitter to the remote station transceiver, a remote station decoder coupled to the remote station transceiver and responsive to said coded calling signal received from the base station transmitter for producing an output indication, a remote station encoder coupled to the remote station transceiver and operative to generate a coded line-connect signal and coded telephone dialing signals for transmission to the base station receiver, a base station decoder coupled to the base station receiver audio output and to said switch means and being responsive to said coded line-connect signal received from the remote station transceiver for generating a second control signal to close said switch means, and timing means coupled to said base station decoder and to said interconnection circuit and responsive a first predetermined time after receipt of said second control signal for interrupting said transmitter audio path for a second predetermined time period.

33. Apparatus for automatically interconnecting a wire telephone line with a simplex radio system including a base station radio receiver having an audio output and a base station radio transmitter having an audio input and at least one remote station radio transceiver, said apparatus comprising an interconnection circuit having receiver terminals coupled to the radio receiver audio output and transmitter terminals coupled to the radio trasmitter audio input and telephone terminals, said interconnection circuit establishing a substantially one-way receiver audio path from said receiver terminals to said telephone terminals and a substantially one-way transmitter audio path from said telephone terminals to said transmitter terminals, receiver lock-out means responsive to the presence of audio signals from the telephone line in said transmitter audio path for interrupting said receiver audio path, switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals therefrom for generating a first control signal, a normally inoperative base station encoder having an output coupled to said transmitter audio input, encoder control means coupled to said ring detector and to said base station encoder and responsive to said first control signal for rendering said base station encoder operative to generate a coded calling signal at its output for transmission by the base station transmitter to the remote station transceiver, a remote station decoder coupled to the remote station transceiver and responsive to said coded calling signal received from the base station transmitter for producing an output indication, a remote station encoder coupled to the remote station transceiver and operative to generate a coded line-connect signal and coded telephone dialing signals for transmission to the base station receiver, a base station decoder coupled to the base station receiver audio output and to said switch means and being responsive to said coded line-connect signal received from the remote station transceiver for generating a second control signal to close said switch means, first timing means coupled to said base station encoder and to said base station decoder and to said interconnection circuit, said first timing means being enabled by said calling signal from said base station encoder and being responsive thereafter to said second control signal from said base station decoder for interrupting said transmitter audio path for a first predetermined time period, and second timing means coupled to said base station encoder and to said base station decoder and to said interconnection circuit and responsive a second predetermined time after receipt of said second control signal in the absence of said calling signal for interrupting said transmitter audio path for a third predetermined time period, said second timing means being responsive to receipt of said second control signal after said calling signal for immediately interrupting said transmitter audio path for said first predetermined time period.

34. Apparatus for automatically interconnecting a wire telephone line with a simplex radio system including a base station radio receiver having an audio output and a base station radio transmitter having an audio input and at least one remove station radio transceiver, said apparatus comprising balanced coupling circuit means having telephone terminals for coupling to the telephone line and having input terminals and output terminals, said balanced coupling circuit means establishing a substantially one-way receiver audio path from said input terminals to the telephone lne and a substantially one-way transmitter audio path from the telephone line to said output terminals, receiver switch means operable between a normal open condition disconnecting the base station receiver audio output from said balanced coupling circuit input terminals and a closed condition connecting the base station receiver audio output to said balanced coupling circuit input terminals, receiver control means coupled to said receiver switch means for controlling the operation thereof between the open and closed conditions thereof, receiver amplifying means coupled to said receiver control means and to the receiver audio output for generating a first control signal fromm the unrectified A.C. audio signals from the base station receiver and applying such control signal directly to said receiver control means with a time delay of not greater than about five milliseconds, said receiver control means being responsive to the first control signal for closing said receiver switch means for the duration of the first control signal to couple the A.C. audio signals to the telephone line, transmitter switch means operable between a normal open condition disconnecting the base station transmitter audio input from said balanced coupling circuit output terminals and a closed condition connecting the base station transmitter audio input to said balanced coupling circuit output terminals, transmitter control means coupled to said transmitter switch means for controlling the operation thereof between the open and closed conditions thereof, transmitter amplifying means coupled to said transmitter control means and to said balanced coupling circuit output terminals for generating a second control signal from the unrectified A.C. audio signals from the telephone line and applying such second control signal directly to said transmitter control means with a time delay of not greater than about five milliseconds, said transmitter control means being responsive to the second control signal for closing said transmitter switch means for the duration of the second control signal to couple the telephone line A.C. audio signals to the base station transmitter, receiver lockout means coupling said transmitter switch means to said receiver switch means for locking said receiver switch means open when said transmitter switch means is closed, variable threshold means coupled between said receiver switch means and said transmitter control means and operative when said receiver switch means is open for rendering said transmitter control means responsive only to second control signal of a first predetermined amplitude and operative when said receiver switch means is closed for rendering said transmitter control means responsive only to a second control signal having a second predetermined amplitude greater than said first predetermined amplitude and greater than that of a second control signal generated in response to any feedback receiver audio signals which might be coupled from said receiver audio path through said balanced coupling circuit to said transmitter audio path, telephone switch means coupled to said telephone terminals and to the telephone line and operable between a normal open condition for disconnecting the telephone line from said telephone terminals and a closed condition for connecting the telephone line to said telephone terminals, a telephone ring detector coupled to the telephone line and responsive to telephone ring signals therefrom for generating a third control signals, a normally inoperative base station encoder having an output coupled to the base station transmitter audio input, encoder control means coupled to said ring detector and to said base station encoder and responsive to said third control signal for rendering said base station encoder operative to generate a coded calling signal at its output for transmission by the base station transmitter to the remote station transceiver, a remote station decoder coupled to the remote station transceiver and responsive to said coded calling signal received from the base station transmitter for producing an output indication, a remote station encoder coupled to the remote station transceiver and operative to generate a coded line-connect signal and coded telephone dialing signals for transmission to the base station receiver, a base station decoder coupled to the base station receiver audio output and to said telephone switch means and being responsive to said coded line-connect signal received from the remote station transceiver for generating a fourth control signal to close said telephone switch means, first timing means coupled to said base station encoder and to said base station decoder and to said transmitter switch means, said first timing means being enabled by said calling signal from said base station encoder and being responsive thereafter to said fourth control signal from said base station decoder for interrupting said transmitter audio path for a first predetermined time period, and second timing means coupled to said base station encoder and to said base station decoder and to said transmitter switch means and responsive a second predetermined time after receipt of said fourth control signal in the absence of said calling signal for interrupting said transmitter audio path for a third predetermined time period, said second timing means being responsive to receipt of said fourth control signal after said calling signal for immediately interrupting said transmitter audio path for said first predetermined time period.

* * * * *